(12) United States Patent
Yao et al.

(10) Patent No.: US 8,763,127 B2
(45) Date of Patent: Jun. 24, 2014

(54) SYSTEMS AND METHOD FOR MALWARE DETECTION

(75) Inventors: Danfeng Yao, Blacksburg, VA (US);
Deian Stefan, Glendale, NY (US);
Chehai Wu, Goleta, CA (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 13/255,567

(22) PCT Filed: Mar. 13, 2010

(86) PCT No.: PCT/US2010/027260
§ 371 (c)(1),
(2), (4) Date: Sep. 9, 2011

(87) PCT Pub. No.: WO2010/105249
PCT Pub. Date: Sep. 16, 2010

(65) Prior Publication Data
US 2011/0320816 A1    Dec. 29, 2011

Related U.S. Application Data

(60) Provisional application No. 61/210,097, filed on Mar. 13, 2009.

(51) Int. Cl.
*G06F 21/00* (2013.01)
*G06F 21/56* (2013.01)
(52) U.S. Cl.
CPC .................................. *G06F 21/566* (2013.10)
USPC ........................................................ 726/24
(58) Field of Classification Search
USPC ........................................ 726/24, 3; 713/171
See application file for complete search history.

(56) References Cited

U.S. PATENT DOCUMENTS

| | | | |
|---|---|---|---|
| 2007/0016953 A1 | 1/2007 | Morris et al. | |
| 2007/0027746 A1* | 2/2007 | Grabowich | 705/10 |
| 2007/0074169 A1 | 3/2007 | Chess et al. | |
| 2007/0094732 A1 | 4/2007 | Mood et al. | |
| 2007/0236330 A1 | 10/2007 | Cho et al. | |

(Continued)

FOREIGN PATENT DOCUMENTS

WO    2007146437 A2    12/2007

OTHER PUBLICATIONS

Marcus de Oliveira, et al. User Authentication based on Human Typing Pattern with Artficial Neural Networks and Support Vector Machine. XXV Congresso da Sociedade Brasileira de Computacao, Jul. 29, 2005, pp. 484-493.

*Primary Examiner* — Gilberto Barron, Jr.
*Assistant Examiner* — Devin Almeida
(74) *Attorney, Agent, or Firm* — Fox Rothschild LLP

(57) ABSTRACT

A system and method for distinguishing human input events from malware-generated events includes one or more central processing units (CPUs), one or more input devices and memory. The memory includes program code that when executed by the CPU causes the CPU to obtain a first set of input events from a user utilizing the input device. The first input events are used to obtain or derive a feature indicative of the user, such as a multi-dimensional feature vector as provided by a support vector machine. Second input events are then obtained, and the second input events are classified against the feature to determine if either the user or malware initiated the second input events.

1 Claim, 22 Drawing Sheets

(56) References Cited

U.S. PATENT DOCUMENTS

| | | |
|---|---|---|
| 2008/0195868 A1* | 8/2008 | Asokan et al. ............... 713/176 |
| 2008/0209557 A1 | 8/2008 | Herley et al. |
| 2008/0226069 A1* | 9/2008 | Tan ............................... 380/255 |
| 2009/0013405 A1* | 1/2009 | Schipka ......................... 726/22 |
| 2009/0143144 A1* | 6/2009 | Schluessler et al. ........... 463/42 |
| 2009/0199296 A1* | 8/2009 | Xie et al. ....................... 726/23 |

* cited by examiner

SYSTEMS AND METHOD FOR MALWARE DETECTION

CROSS-REFERENCE TO RELATED APPLICATIONS

This application is the U.S. National Phase of International Patent Application Serial No. PCT/US10/27260, filed Mar. 13, 2010, which claims the benefit of U.S. Provisional Patent Application Ser. No. 61/210,097, filed Mar. 13, 2009, both of which are incorporated herein by reference in their entireties.

STATEMENT REGARDING FEDERALLY FUNDED RESEARCH

The Research Leading to the present invention was supported in part, by National Science Foundation Grant No. CCF-0648985. Accordingly, the U.S. Government may have certain rights in this invention.

STATEMENT OF INDUSTRIAL APPLICABILITY

The present invention has industrial applicability in all areas involving computer use, equipment, software and manufacture.

FIELD OF THE INVENTION

The present invention relates generally to malware detection systems and methods. More particularly, the present invention discloses malware detection systems and methods that distinguish computer usage patterns of a human user from those of the malware to facilitate detection of the malware.

BACKGROUND OF THE INVENTION

Several studies have estimated that millions of computers worldwide are infected by malware and have become bots that are controlled by cyber criminals, forming so-called botnets. The infected computers forming these botnets are coordinated and used by the attackers to launch diverse malicious and illegal network activities, including perpetrating identity theft, sending an estimated 100 billion spam messages every day, launching denial of service (DoS) attacks, committing click fraud, etc. The victim's computing experience also suffers as the computing cycles wasted on bot-induced (i.e, computer generated) events and activities typically slow down the performance of the machine.

The task of botnet detection is two-fold: (1) to identify individual infected computers, also called zombies, and to clean the infection, and (2) to identify and prosecute the mastermind who controls the botnet. End-user systems and methods typically focus upon the first task, as the second task usually involves law enforcement measures beyond a technical scope. Determining whether a personal computer (PC) managed by an average Internet user is infected or not can be very challenging. Malicious bots are stealthy and difficult to detect using conventional anti-virus software. Some bots even disable the anti-virus software immediately after they successfully infect a machine. A good description of botnet structures is disclosed, for example, in a paper by D. Dagon, G. Gu, C. P. Lee, and W. Lee, "A taxonomy of botnet structures," in ACSAC, pages 325-339, IEEE Computer Society, 2007. An overwhelming majority of personal computer users lack the technical expertise to combat bot infection on their own, highlighting the importance of botnet detection solutions.

Most existing botnet detection solutions focus on analyzing the network traffic of potentially infected machines to identify suspicious network communication patterns. In particular, the traces of botnets' command and control (C&C) messages, i.e., how bots communicate with their botmasters (also known as botherders), are captured and their signatures are analyzed. For example, a host may be infected if it periodically contacts a server via Internet Relay Chat (IRC) protocol and sends a large number of emails afterwards. Network trace analysis is a significant aspect of identifying malicious bots. These solutions usually involve complex and sophisticated pattern analysis techniques, and have been demonstrated to produce good false positive and false negative rates. They can be deployed by local Internet Service Providers (ISPs) to monitor and screen a large number of hosts as part of a network intrusion-detection system.

Botnets are, however, entities that are constantly evolving to avoid detection, and their behaviors change accordingly. For example, although IRC is still the dominating botnet command and control protocol, recent studies have found that many botmasters are responding to detection systems by switching away from IRC to HTTP, as HTTP traffic is usually allowed through firewalls and can be easily camouflaged (to be used for covert channels). The majority of the current botnet detection solutions focus on using the characteristic behaviors of bots to identify malicious activities. Thus, changes in bot patterns require constant improvements in the detection methods; sole reliance on following and leveraging bots' behaviors for detection is relatively reactive and may require constant modifications in order to keep up with the newest development of botnets.

Accordingly, there is an immediate need for improved systems and methods that are capable of detecting botnet malware on a host computer.

SUMMARY OF THE INVENTION

In one aspect, a system for distinguishing human input events from malware-generated events is disclosed. In a specific embodiment the system includes one or more central processing units (CPUs), one or more input devices and memory communicatively coupled to the CPU. The memory includes program code that when executed by the CPU causes the CPU to obtain a first set of input events from a user utilizing the at least an input device. The first input events are used to obtain or derive a feature indicative of the user, such as a multi-dimensional feature vector as provided by a support vector machine. Second input events are then obtained, and the second input events are classified against the feature to determine if either the user or malware initiated the second input events.

In certain embodiments the second input events are collected as part of a challenge sent to the user in response to detecting suspicious activity.

Certain specific embodiments employ principle component analysis to reduce the dimensionality of the feature vector so as to increase processing speeds, increase classification accuracies, or both.

In preferred embodiments the input device is a keyboard and the first input events include timing information related to the user pressing keys on the keyboard.

In various embodiments the system may be implemented in a client-server arrangement, in which input events generated by the client are forwarded to a server for training and classification purposes. In a specific embodiment a lightweight cryptographic function is provided to ensure that only input events initiated by the user of the client machine are processed by the server so as to detect and prevent events potentially injected by malware. Such a system further includes networking hardware capable of communications with the client, and the program code causes the at least a CPU to perform an RSA key exchange with the client, obtain cryptographically signed third input events from the client, and verify a signature of the cryptographically signed third input events. In particularly preferred embodiments a Trusted Platform Module (TMP) is employed for supporting the cryptographic functions and to ensure a trusted pathway between the application layer and the kernel layer for the input events. The TPM chip is installed and activated on the client computer and is used to generate digital signatures for each input event. The signing keys are derived from the secret key stored on the TPM chip at the time of manufacture, and negotiated with the server; the server in turn has the corresponding verification keys. In variations, if the signature does not pass the verifying step then a warning message is sent to the client.

In another aspect a computer system for distinguishing user-initiated outbound network traffic from malware-initiated outbound network traffic is disclosed. The network traffic is provided by a plurality of packets that employ a multi-layered communications protocol comprising an upper application layer, a lower physical layer and a plurality of intermediate layers. The system includes at least a central processing unit (CPU), networking hardware capable of carrying the network traffic and memory communicatively coupled to the CPU. The memory includes program code executable by the CPU to cause the CPU to cryptographically sign a packet at a first layer within the plurality of intermediate layers, and subsequently verify the signature of the packet at a second layer in the plurality of intermediate layers, in which the second layer is at a lower layer than the first layer. The packet is correlated with malware-initiated outbound network traffic if the signature of the packet at the second layer is not verified.

Certain embodiments determine if the packet originates from any known application obtained from a process table. Preferred embodiments permit the packet to be sent as outbound traffic prior to completing verification of the signature so as to avoid any bottlenecks.

In another aspect yet another computer system for distinguishing user-initiated outbound network traffic from malware-initiated outbound network traffic is disclosed. The system includes at least a central processing unit (CPU), at least an input device, networking hardware capable of carrying the network traffic, and memory communicatively coupled to the CPU. The memory includes program code executable by the CPU to cause the CPU to monitor input events generated by the input device, monitor outbound network traffic events, perform string comparison between the input events and the outbound network traffic events, and distinguish malware-initiated outbound traffic according to the examination of content appearing in the network packets. In specific embodiments, the inputs events are obtained through the network applications, and contain application-specific information associated with the users' input actions.

DETAILED DESCRIPTION

Introduction

Figure 1:
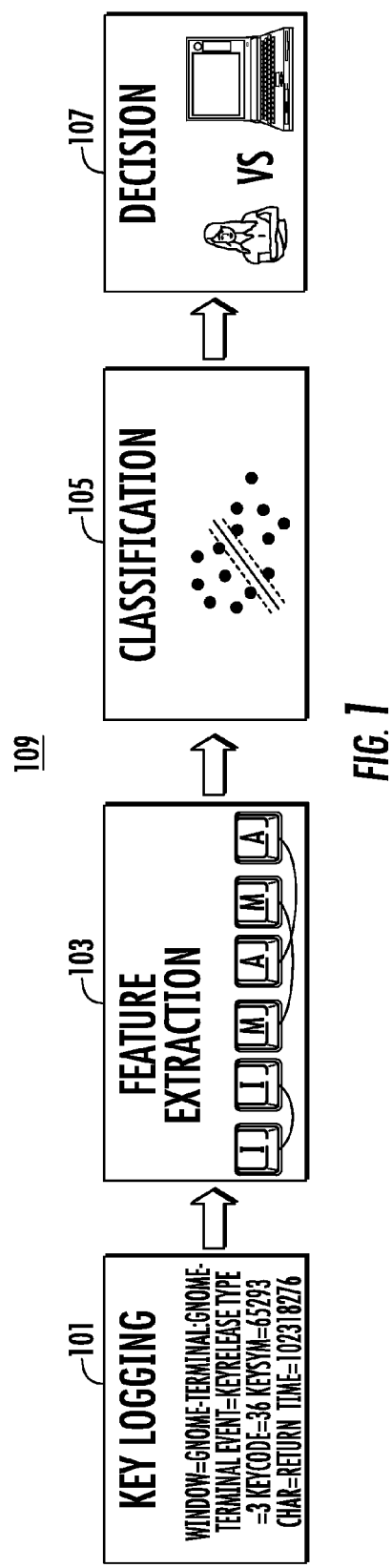
FIG. 1 is a flow chart of a method for detecting malware, in accordance with an embodiment of the present invention.

The element of human behavior has been largely ignored in most botnet research, with one notable exception where chat bots and human behaviors in Internet chat are characterized. Various embodiment systems and methods adopt an approach that utilizes the characteristic behaviors of humans, instead of the behaviors of bots or adversaries in general. There are intrinsic differences between how a person and a bot use and react to a computer. These differences can be utilized to distinguish humans from malware and in turn aid in the detection of infected hosts. That is, these intrinsic differences can be used to distinguish human input events, for example, from events that are instigated by the malware. Several studies show that people have unique rhythms in many computer interactive activities. For example, research in keystroke dynamics has demonstrated that a person tends to type with characterizable patterns, which can be used as a biometric for authentication. Another example of an easily distinguishable characteristic between a human and a bot is that a bot can send a huge number of unique email messages without any keyboard interface, while the fastest human typist can only type at a rate of 370 keystrokes per minute. Spam messages are, however, usually unique, although based on a general template, so as to avoid being filtered. Numerous research efforts have shown that people demonstrate unique patterns in how they surf online. By investigating and utilizing unique human behavior patterns, embodiment systems and methods provide malware detection solutions that are proactive and robust toward future generations of botnets.

Existing detection solutions closely follow how botnets behave and thus are reactive. Disclosed herein are embodiment system and method security technologies that aim to detect a compromised personal computer by monitoring and analyzing the characteristic human behavior patterns of the PC owner. Embodiments provide such Personalized Bot Detection (PBD) systems and methods that can be installed on and used with one or more computers. In various embodiments, a PBD system extracts and learns the PC owner's computing patterns including, for example, surfing, email, and input behaviors. A PBD system may include one or more of the following features: (1) collects and analyzes the keystroke dynamics of the human user in a client-server architecture, and uses the typing patterns as a metric for detecting anomalies including but not limited to bot infection; (2) provides a lightweight cryptographic verification mechanism to ensure the integrity of PBD detection operations and prevent the injection of fake input events; (3) provides a technique for detecting backdoor bot traffic through the correlation analysis between the input events and network packets; and (4) provides a lightweight cryptographic detection method that identifies abnormal execution of network stack calls (these types of calls are typically used by bots, malware and rootkits).

In different embodiments, the systems and methods of the present invention have myriad applications, including but not limited to: (1) Use as consumer security software (either alone or bundled with other software) to help a PC owner accurately detect anomalies caused by various malware infection including botnets; (2) Use by organizations to protect workplace PCs against botnet infection using a client-server architecture; (3) Deployment as a security service to consumers with subscription fees; (4) Use with other personal computing devices, e.g., smart phones; and (5) Use by organizations (financial institutions, military, government) as insider threat detection software that prevents malicious insiders from performing disruptive and damaging actions to the organizations.

Various embodiment PBD systems use human keystroke dynamics to identify bot infection. Specific embodiments focus on the characteristic behavior patterns of humans, as opposed to those of bots. Conventional security solutions are based on analyzing the attackers' characteristics; however, as attack patterns constantly evolve, existing security solutions soon become obsolete and require improvement. Embodiment PBD systems provide personalized, robust, pro-active, and accurate detection of malware infected computers. PBD is capable of defending against the newest exploits and attacks without the need for security updates and patching. Existing technologies are slow in responding to new and emerging attacks because they need to first extract the signatures from known attacks, which is not required by various embodiment PBD systems.

Various embodiment systems and methods employ a new methodology to recognize anomalies based on the unique characteristics of human behaviors. Such embodiment user-centric behavior-driven approaches explore and utilize the fundamental and characteristic distinctions between a human and a bot. By naturally leveraging these unique features, embodiment systems are able to realize simple and robust malware detection tools that are difficult for future generations of bots to circumvent.

Towards that goal keystroke dynamics may be used as a trait to recognize intruders. In certain embodiments the user of a computer trains the machine to learn his or her typing style with a small number of strings. This data is then used to distinguish the user from a bot. Recognition of keystroke dynamics is a cheap, non-intrusive, and reliable biometric approach to bot detection. Other aspects are summarized as follows.

Various embodiment systems and methods implement a simple and easy-to-adopt protocol for authenticating a PC owner that utilizes the user's keyboard activities as an authentication metric. Embodiment protocols may be provided in a lightweight client-server architecture using the X Windows System (X11 for short), for example.

Keystroke data from a group of users on a diverse set of inputs may be analyzed, including email addresses, passwords, and web addresses (or URLs). Performance results vary according to the strings used for authentication. Embodiment systems may employ a sliding-window method for extracting and storing keystroke features, which can be applied to continuous and non-intrusive authentication of the keystrokes associated with longer strings, e.g., email messages. Multiple features from the keystroke data may be extracted into a vector, such as but not limited to key duration (time a key is held down) and various inter-key timings. Principle component analysis (PCA) may be used to reduce the dimensionality of the feature vectors and support vector machines (SVMs) may then be used for classification. Various embodiments may exhibit very low false negative and false positive rates. In certain embodiments PCA may play a significant role in improving the prediction accuracy.

A user-based bot detection solution framework, called herein the user-based analyzer, is also provided. Unlike existing botnet detection methods that mainly focus on network traffic analysis, the user-based analyzer explores the uniqueness in human keystroke dynamics, and uses it as a strong indicator for potential bot infection.

To demonstrate the robustness of remote keystroke authentication, two bot programs, called GaussianBot and NoiseBot, respectively, were implemented that are capable of injecting statistically-generated keystroke event sequences on a (victim) machine. The goal of the bot programs is to pass embodiment keystroke authentication tests by mimicking a particular user's keystroke dynamics. Experiments show that embodiment classification is robust against several types of attacks, and is able to correctly classify the attacks by GaussianBot and NoiseBot with extremely low false positive rates.

In order to further improve the robustness of the user-based analyzer, various embodiments present a user-based analyzer integrity service architecture and implementation. Embodiment integrity verification mechanisms prevent bots from injecting fake keystroke events into computers. To that end, various systems and their related methods may employ a lightweight cryptographic protocol on keystroke events. Various systems and methods may also prevent tampering attacks on the user-based analyzer by leveraging an on-chip Trusted Platform Module (TPM).

Further disclosed are embodiment network-based bot detection techniques that are complementary to the user-based analyzer, which are called herein the network-based analyzer. The network-based analyzer discloses a novel detection technique that identifies suspicious bot processes by analyzing the correlations between network traffic and input events of the processes. Rather than performing time-based analysis as in the user-based analyzer, the network-based analyzer framework aims to identify and block suspicious network traffic, i.e., packets, that are originated from applications without explicit user input activities. Thus, in an embodiment network-based analyzer, the provenance of network traffic is monitored and correlation analysis is performed between network packets and user input activities.

Embodiments of the network-based analyzer approach provide a general mechanism for detecting anomalies in hosts that have applications beyond the specific botnet problem studied. Embodiment techniques can be used as a basic framework to build personal firewalls, for example. In addition, embodiments can be used to detect malicious rootkits, which are a type of stealthy malware hiding themselves in the host operating system.

Overview

This section describes the security goals, assumptions, and adversary model that embodiments of the user-based analyzer may consider. Also disclosed are two embodiment architectures for implementing the user-based analyzer, one as a client-server protocol and the other as a stand-alone program on the user's machine.

FIG. 1 illustrates a flow chart of an exemplary method 109 in an embodiment of the invention. First, keystroke information is recorded 101. Next, specific feature information is extracted 103 from the recorded keystroke information, and is analyzed to determine how the keystroke(s) should be classified 105. This classification is then used in determining 107 whether the keystroke(s) are human or bot generated.

Figure 2:
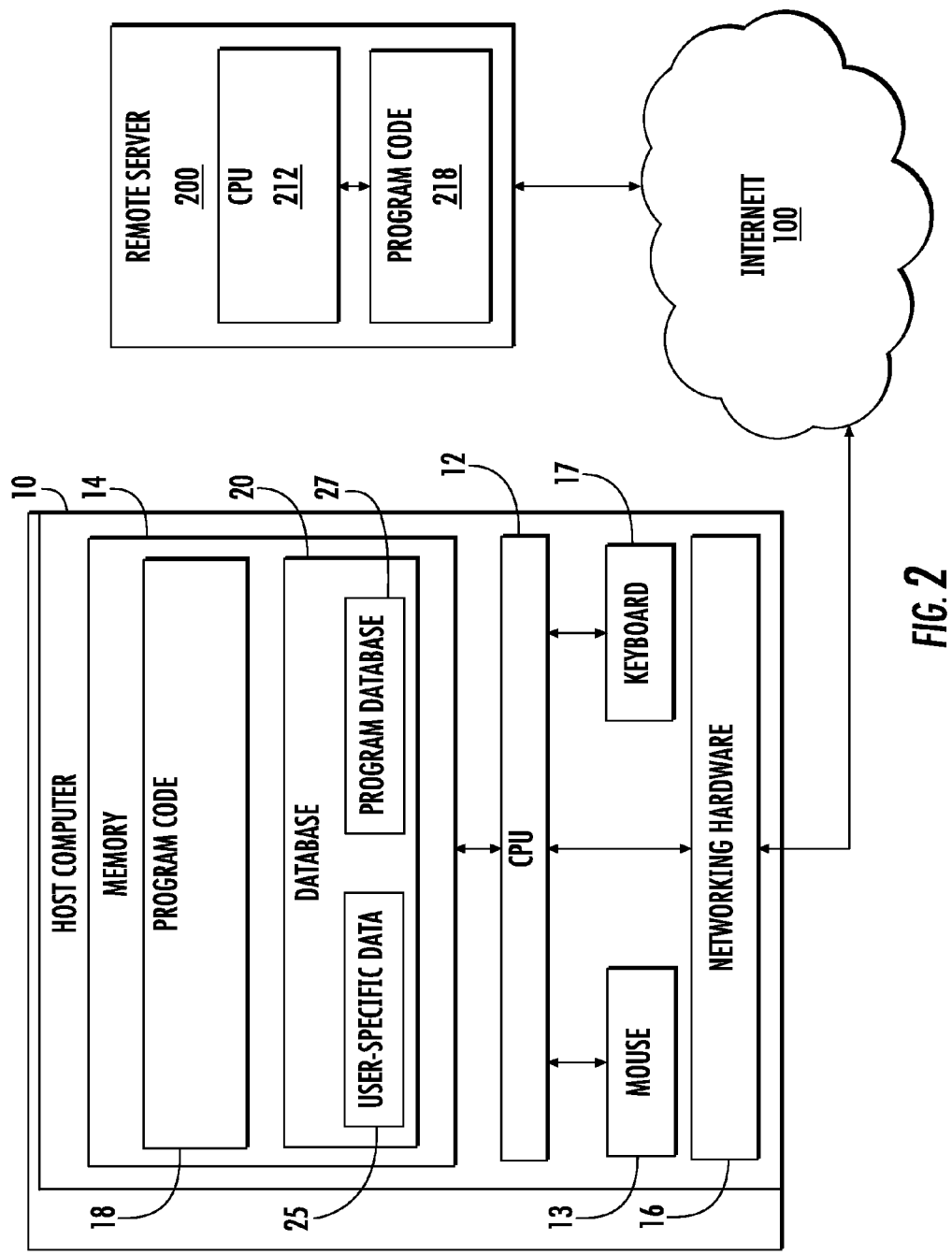
FIG. 2 is a block diagram of an system for detecting malware, in accordance with an embodiment of the present invention.

FIG. 2 illustrates an embodiment system for performing an embodiment method, such as that indicated in FIG. 1. The system may be a host computer 10 communicatively connected to a network, such as to the Internet 100. The host computer 10 may include one or more central processing units (CPUs) 12 coupled to memory 14 and networking hardware 16, all of which may be conventional as known in the art. The CPU is also communicatively connected to one or more input device, such as but not limited to a keyboard 17 and/or mouse 13. The networking hardware 16 is in communications with the CPU 12 such that the CPU 12 can process network traffic inbound from the Internet 100 and deliver outbound network traffic to the Internet 100 utilizing, for example, a multi-layered networking protocol, such as TCP/IP. The memory 14 may include both volatile and non-volatile memory and stores program code 18 executable by the one or more CPUs 12. The program code 18 causes the CPU(s) 12 to perform various steps that direct the host computer 10 to perform one or more embodiment methods, such as an embodiment of the user-based analyzer, an embodiment of the network-based analyzer, or both. Providing the program code 18 should be routine for one of reasonable skill in the art after having had the benefits of the instant disclosure. Use of a computer database 20 for storing user-specific data 25 and/or a program database 27 is also envisioned, although persons of ordinary skill routinely make use of alternative strategies for storing data for use by a CPU 12.

The program code 18 may reside on the computer 10, for example in permanent memory, such as on a hard disk, and then be loaded into non-volatile memory for execution, or may, for example, be obtained from a remote server 200 via the networking hardware 16 and then loaded into non-volatile memory for execution. Other variations as known in the art are also possible. For example, the program 18 may simply contain code sufficient to relay data to the remote server 200, which in turn has program code 218 executable by the CPU 212 on the server 200 that causes the server 200 to perform the bulk of the analysis for malware detection, and then sends results thereof back to the computer 10, which the program 18 uses to issue warnings to the owner of the computer 10, or to perform other corrective actions. It will be appreciated that each of these may simply be variations on a common underlying logical theme, implemented using well-known networking and multi-processor programming techniques, in which program code 18, 218 is executed by one or more CPUs 12, 212 to perform malware detection for the benefit of host 10.

Security Model

Various embodiments may be developed for personal computers, such as the host 10, that are regularly used by one or more individuals, e.g., a home or workplace computer. In the following, an individual who has legitimate access to the computer 10 is referred to as the owner. For the sake of simplicity in the following discussions it is assumed that a computer 10 has one owner; it will be appreciated, however, that embodiments can be easily generalized to a multi-owner setting using techniques known in the art.

Embodiment Security Goal: Certain embodiments aim to prevent unauthorized use of a personal computer 10 by a malicious bot (as part of a botnet) or by an individual who is not the owner. Specifically, various embodiments address the following question: Is the computer 10 being used by the authenticated owner or by others, e.g., a bot or a human intruder/adversary?

Embodiment Assumptions: Various embodiments of the invention assume that the embodiment detection program 18, the user-based analyzer, is not corrupted or disabled on the user's computer 10. Certain client-server architecture embodiments assume that the computer 10 owner can establish a secure channel with a user-based analyzer remote server 200, such as via the Internet 100, and that the user-based analyzer remote server 200 is secure. For the stand-alone architecture, there may be no need for the remote server 200 and thus the former two assumptions may not be necessary. Instead, it may be assumed that the user-based analyzer 18 has a small secure data storage as part of the memory 18 that is not accessible by the adversary. Such assumptions may be plausible if existing secure storage solutions are used, as known in the art. Various embodiments assume that the user's computer 10 is not infected during the training phase, but may be infected and recruited into a botnet after the training phase has ended. For the sake of simplicity, in what follows, disclosed embodiments assume that any malicious keyloggers installed on the user's computer 10 can be detected and removed. By way of example, however, this last assumption may be removed by having, for example, a trusted reference monitor for the keyboard device driver.

Adversary Model: An adversary may infect the user's computer 10 through, for example, social engineering and/or malware. The infected computer 10 may belong to a large botnet controlled by the adversary in order to carry out malicious network activities. The adversary considered may be able to monitor, intercept, and modify network traffic between the owner of the computer 10 and the rest of the Internet 100. Various embodiments assume that a powerful adversary has access to the keystroke data of the general public, except that of the target computer's owner. In other words, specific embodiments assume that the adversary is capable of collecting, analyzing, and synthesizing keystroke data from anyone other than the owner. The adversary's goal is to forge and mimic the owner's keystroke patterns that pass the authentication tests.

Architecture: An embodiment user-based analyzer framework can be realized with a stand-alone program 18 on the client's local machine 10. The program 18 is responsible for collecting training keystroke data, building learning models, analyzing, and classifying the user-based analyzer challenges. This type of stand-alone architecture is easy to deploy and implement. It may, however, be required that the user ensure that the program 18 is running and that proper measures are taken if the user-based analyzer 18 issues warnings or alerts.

Figure 3:
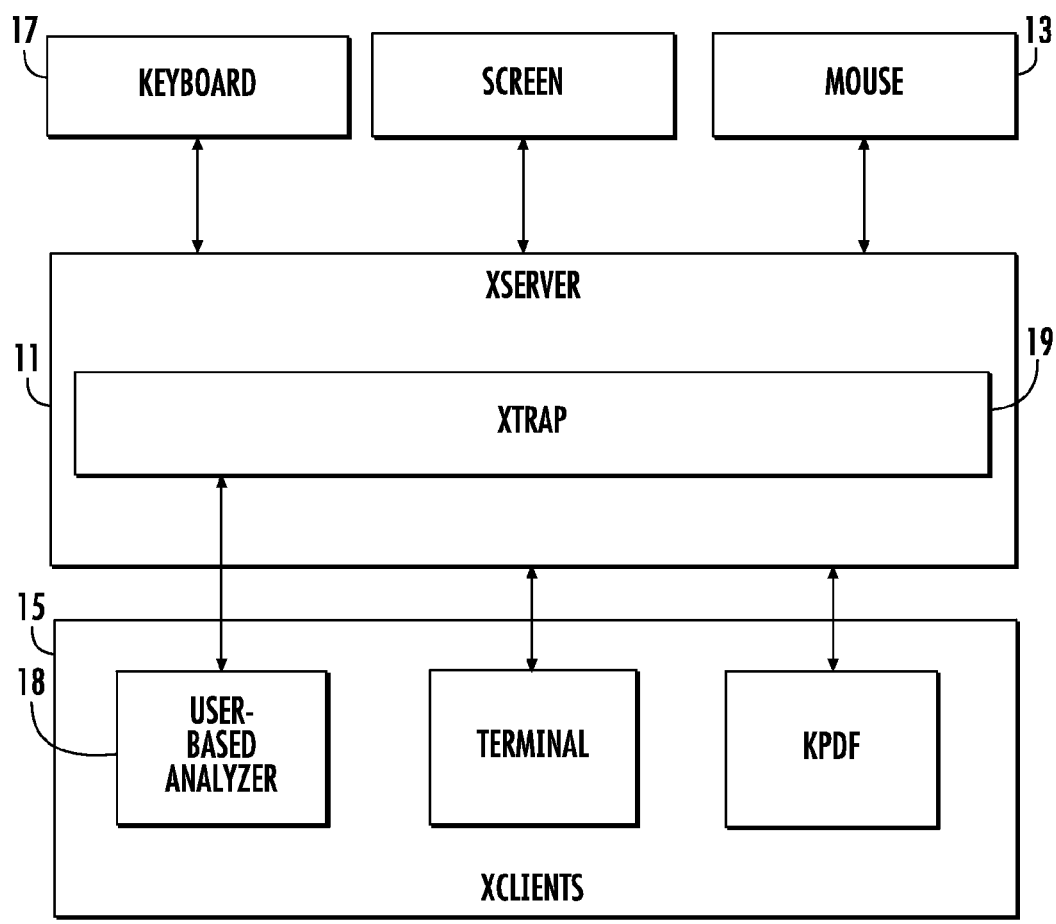
FIG. 3 is a block diagram of another system for detecting malware, in accordance with an embodiment of the present invention.

As mentioned, the user-based analyzer 18 can also be implemented as a client-server protocol. FIG. 3 shows an exemplary embodiment of the user-based analyzer program 18 as an X11 application running on a local machine 10 in the stand-alone architecture approach, or equivalently, as running on a remote server 200 in the client-server approach. The server 200 can be run by the local ISP or a trusted company providing security services for the user, which is analogous to a home security company in the physical world (e.g., ADT). The server 200 is responsible for data collection and analysis in a remote fashion, e.g., by using SSH (Secure Shell) to remotely login to the server 200 with X11 forwarding enabled so that the keystroke events can be monitored by the server 200. Specific embodiments assume the connection and storage of the remote server 200 is secure. It will be appreciated that embodiments can be run in either mode of operation, as a local program or a client-server protocol, as discussed earlier.

A Use Scenario in Client-Server Architecture

An overview of the user-based analyzer 18, 218 workflow is shown in FIG. 1. To provide a better context of an embodiment authentication framework, the following describes a usage scenario of the user-based analyzer 218 in a client-server architecture as follows.

Training Phrase: The remote authentication server 200 collects user input event data, such as keystroke data, from a legitimate user.

Step (a): The user computer 10 and the remote authentication server 200 (for example, one run by an ISP or antivirus company) authenticate each other and set up a secure connection. The user on the user computer 10 then provides examples of user input event data, such as by typing M strings $s_i$, i=1, . . . , M, as specified by the server 200, n times each.

Step (b): The authentication server 200 records the user input event data, such as the keystroke data, from the user computer 10, which is possible, for example, using the X Window System. It will be appreciated, however, that any suitable system may be employed, whether conventional or custom-designed. In a specific embodiment, the user runs X server with an extension (XTrap), which intercepts the user's input event data (e.g., the keystroke events) and sends the information to the application 218 on the remote authentication server 200. Note that in X Window System the user's machine 10 is called the X server and the remote program 218 is called the X client, which may seem counter-intuitive at first sight. Section 4 describes in detail an embodiment implementation method.

Step (c): Once a sufficient number of samples have been collected, the authentication server 200 processes the user's input event data by training a support vector machine, the details of which are presented in Section 3.

Triggering events: The user's malware detection tool (e.g., BotHunter) detects a suspicious bot-like pattern in the network traffic (e.g., scanning machines on the local network for known network exploits). Such suspicious pattern activity may be termed a trigger event. A trigger event can be generated by any applicable, existing botnet detection tools, or it can be caused by simple events that are generated by analyzing the correlation between the user's activities and network traffic (e.g., sending email while being idle, or suspicious HTTP traffic without mouse activities). The trigger event may cause an authentication test to be launched. More detailed description and a list of suspicious events are given in Section 2.3.

The user-based analyzer 18, 218 challenge: The user-based analyzer 18, 218 prompts the user with a window in which to provide a chosen form of user input, such as by typing a chosen string $s_i$. Based on this user's input event data (e.g., keystroke timing data) and the classification model built during the training phrase, the user-based analyzer 18, 218 predicts whether the user is the legitimate owner or not.

If the user passes the authentication test and is verified as the owner of the PC 10, then the user-based analyzer 18, 218 informs the owner that a suspicious event has been observed and asks whether the owner is aware of it. For example, if the computer 10 is being used to send email with spam-like characteristics, or has an unusual chat application running (possibly an IRC-based C&C channel), or periodically visits a web server in China with no hostname or other records (a possible HTTP-based C&C channel). This tool can assist the user to identify potential stealthy intruders on their machine 10.

Trigger Events

A user-based analyzer authentication test can be triggered periodically or when one or more suspicious events are observed. Embodiment user-based analyzer authentication models and their related program code 18, 218 can also run in a non-intrusive mode where the user's input event data, such as keystroke timing, is analyzed without explicitly prompting an authentication window for the user to type into, mouse into, or otherwise provide input event data.

In the following an event may include a set of network and/or input activities (keyboard 17 or mouse 13). Suspicious events are activities that may be pre-defined and related to malicious bot activities, such as sending a large number of email messages (potential spam) or making a large number of HTTP requests to a single target host (potential Denial of Service (DoS) attacks). A suspicious event can be related to external inputs, such as the computer 10 sending email (i.e., SMTP traffic) without any prior keyboard 17 or mouse 13 activities. Some additional examples of trigger events that can be used to start a user-based analyzer 18, 218 challenge may include: HTTP requests without a browser process which can be identified using suitable process identification means, such as lsof or netstat, for example; certain user-initiated network activities such as sending email without keyboard 17 or mouse 13 input or when a screensaver is active (indicating periods of user inactivity); listening to sockets on suspicious ports; sending high-volume traffic to a single target host; attempting to disable the bot detection program, etc. A trigger event need not, however, be used as the sole indicator of a possible bot infection, as the event may be legitimate and not caused by a malicious bot (e.g., a cron job which comprises sending email messages). An embodiment goal is to find out whether or not such events are generated by the owner of the computer 10 based on keystroke pattern recognition, the details of which presented in Section 3.

Feature Extraction and Classification in the User-Based Analyzer

In this section, embodiment feature extraction and classification procedures are described. In particular, this section explains how specific embodiments handle high-dimensional features in keystroke analysis and the security implications thereof.

Figure 4:
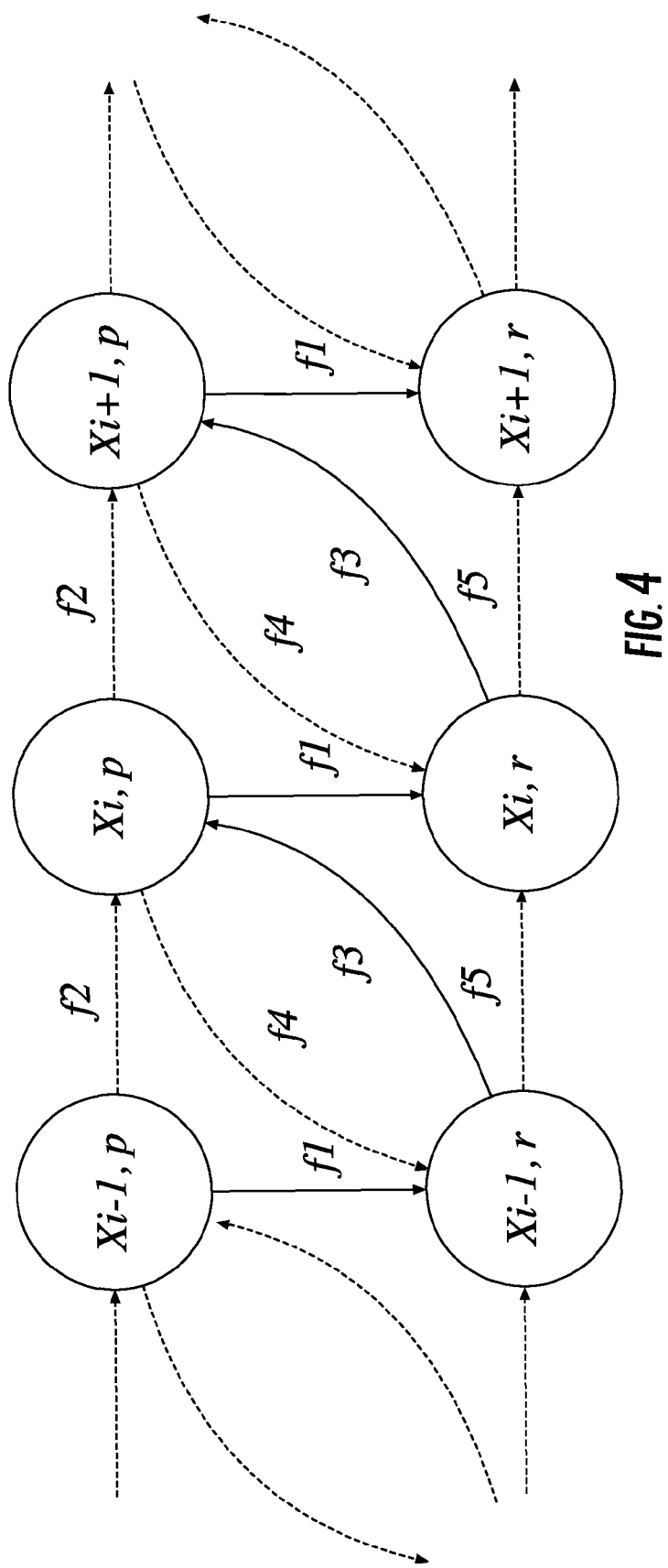
FIG. 4 illustrates comparisons between the typing abilities of a person and a bot modeled by using a first-order Markov chain, in accordance with an embodiment of the present invention.
Figure 5A:
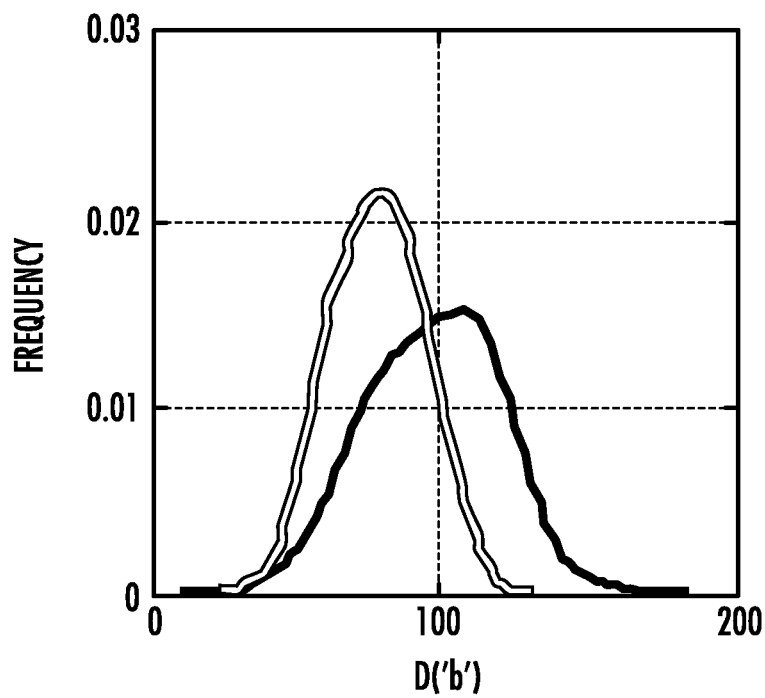
FIGS. 5A to 5F illustrate an exemplary density of two users' key duration in milliseconds while typing the word "botnet", in accordance with an embodiment of the present invention.
Figure 5B:
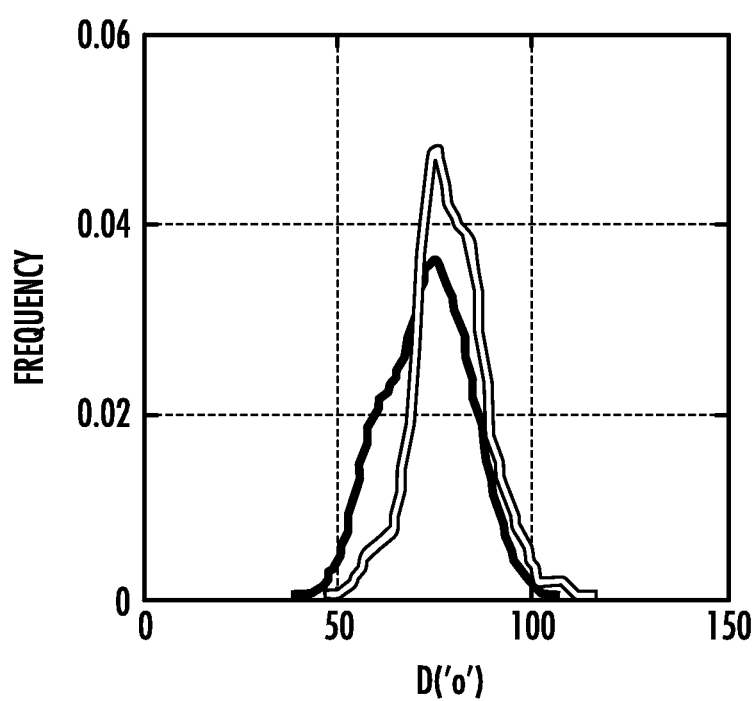
Figure 5C:
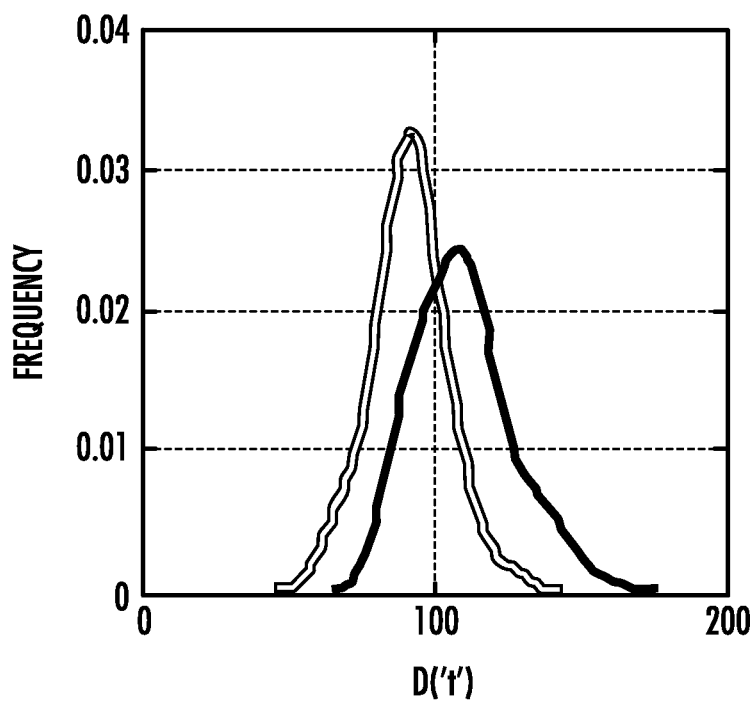
Figure 5D:
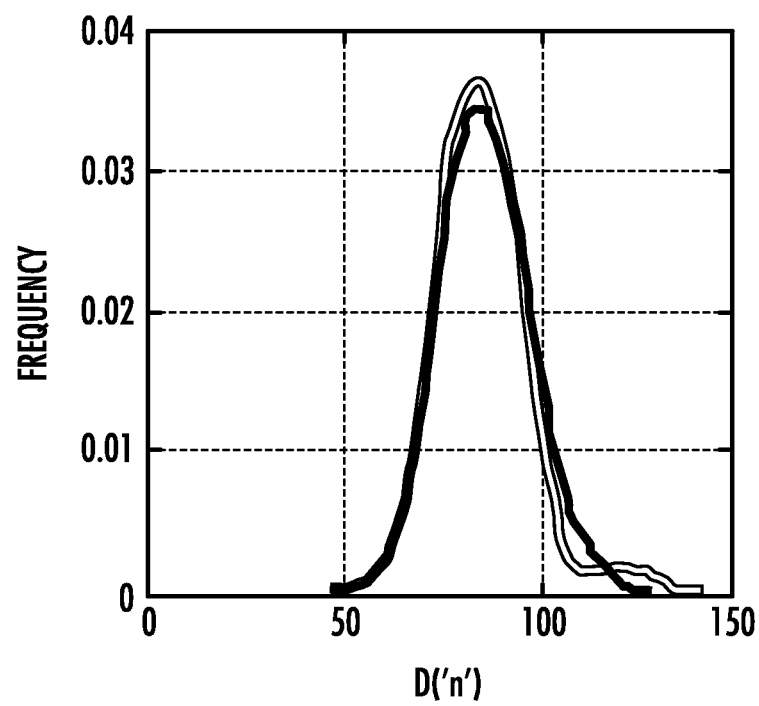
Figure 5E:
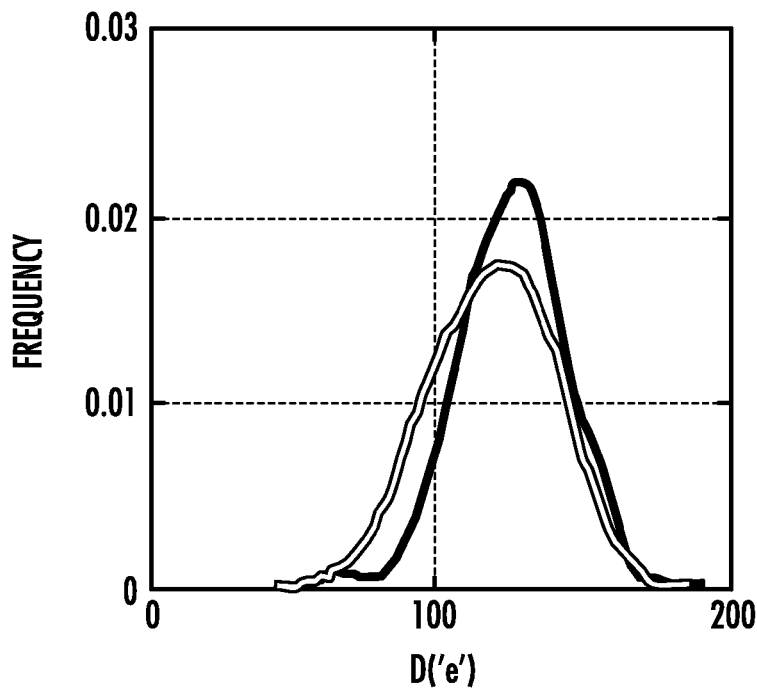
Figure 5F:
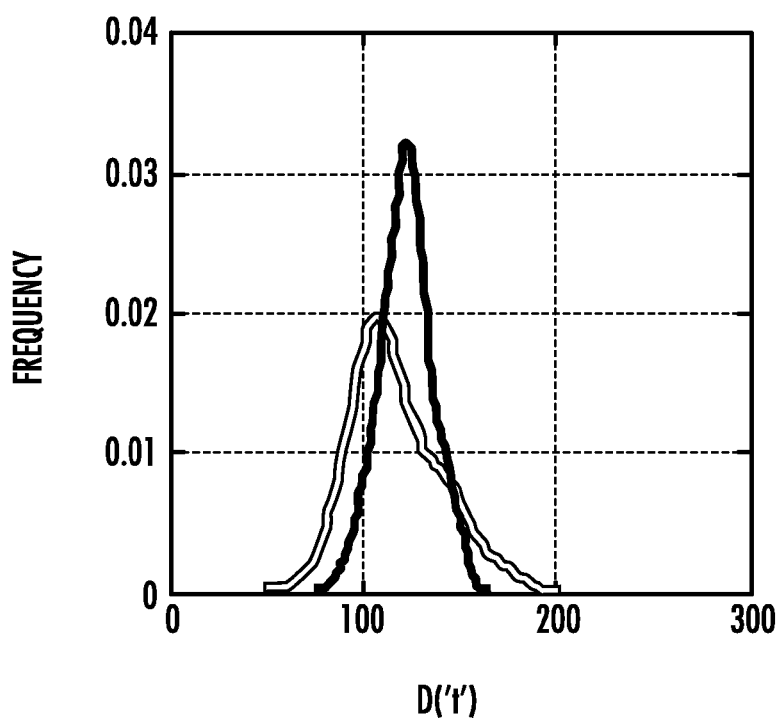
Figure 6A:
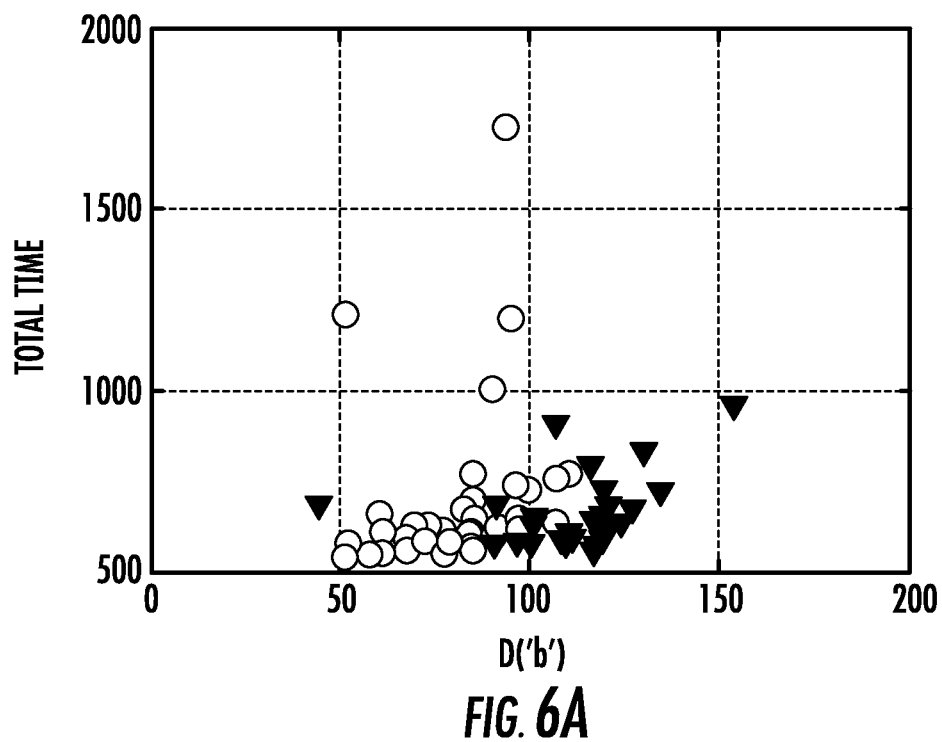
FIGS. 6A to 6F illustrate an exemplary distribution of two keystroke features in milliseconds, in which the first user's data is shown with circles and the second user's data is shown with triangles, in accordance with an embodiment of the present invention.
Figure 6B:
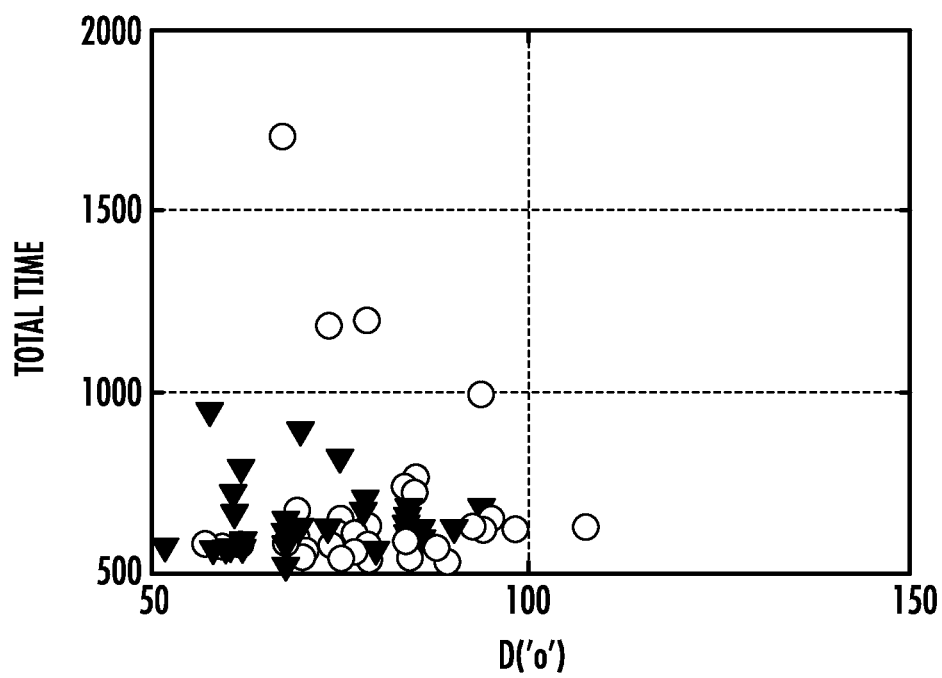
Figure 6C:
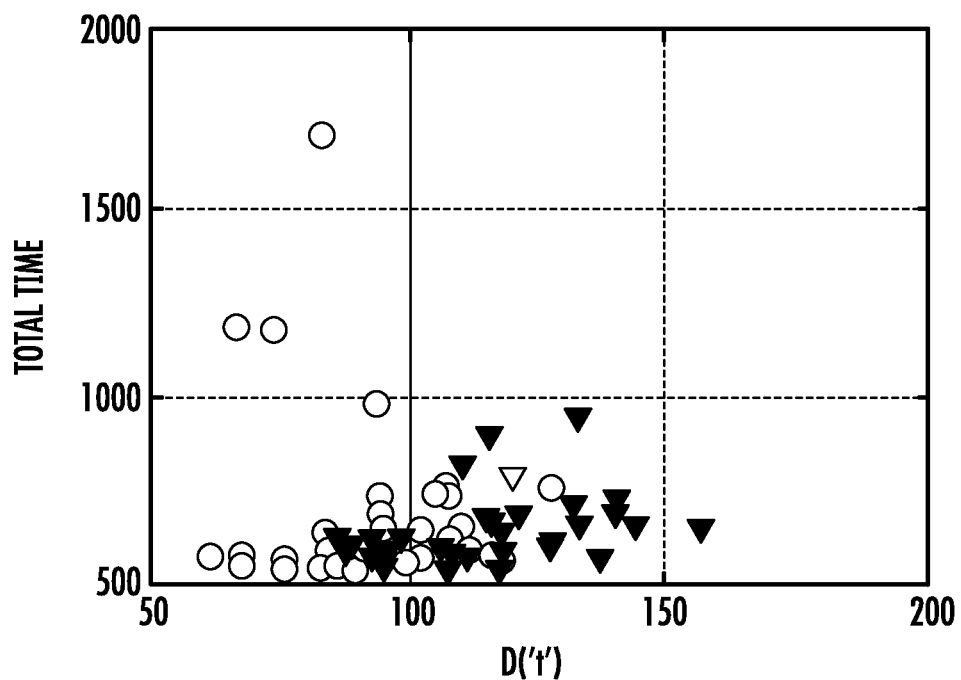
Figure 6D:
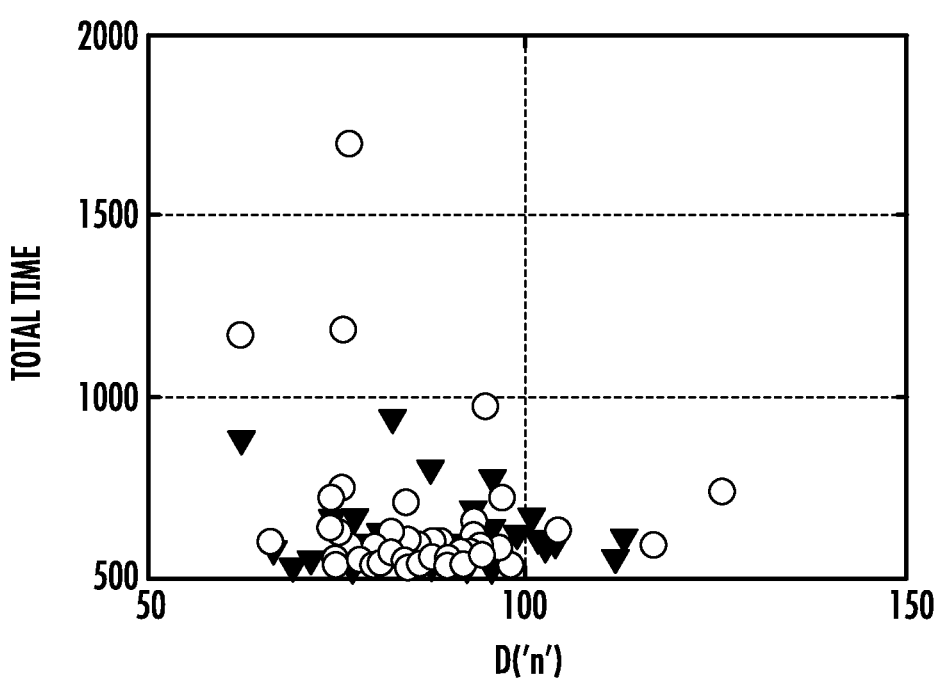
Figure 6E:
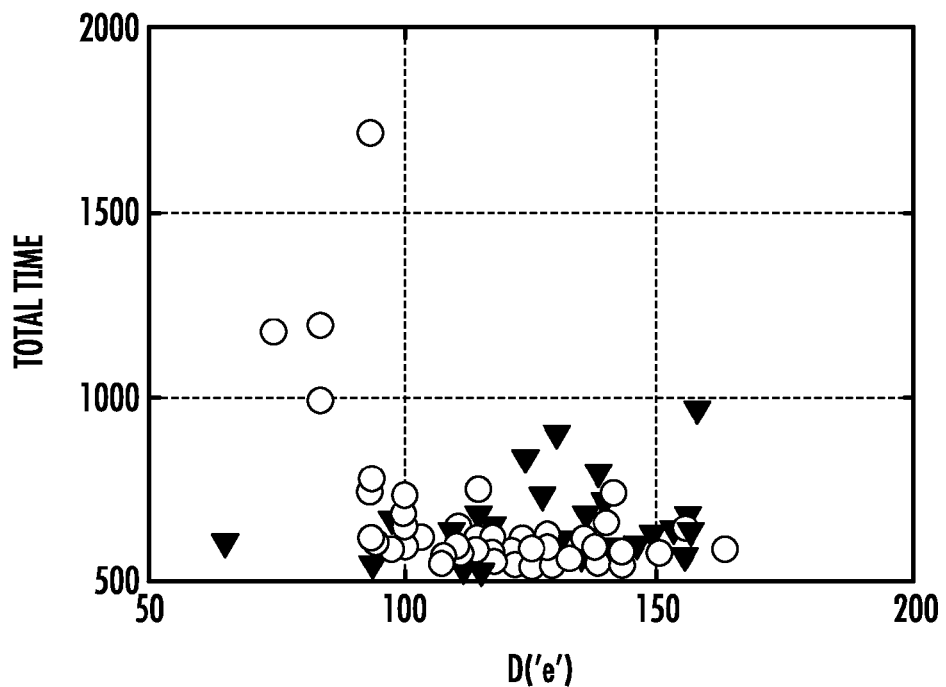
Figure 6F:
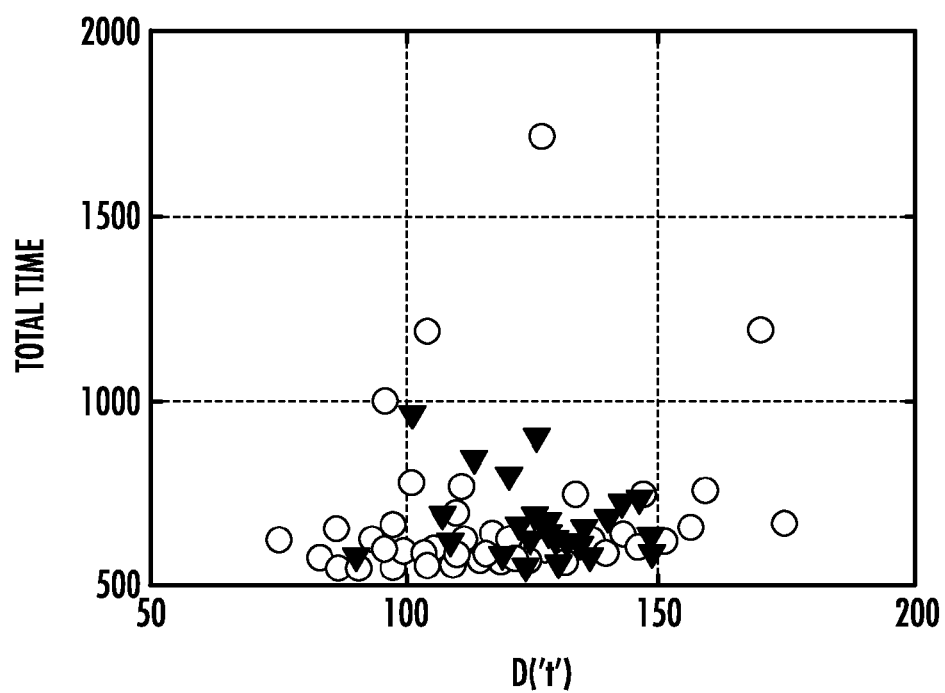
Figure 7A:
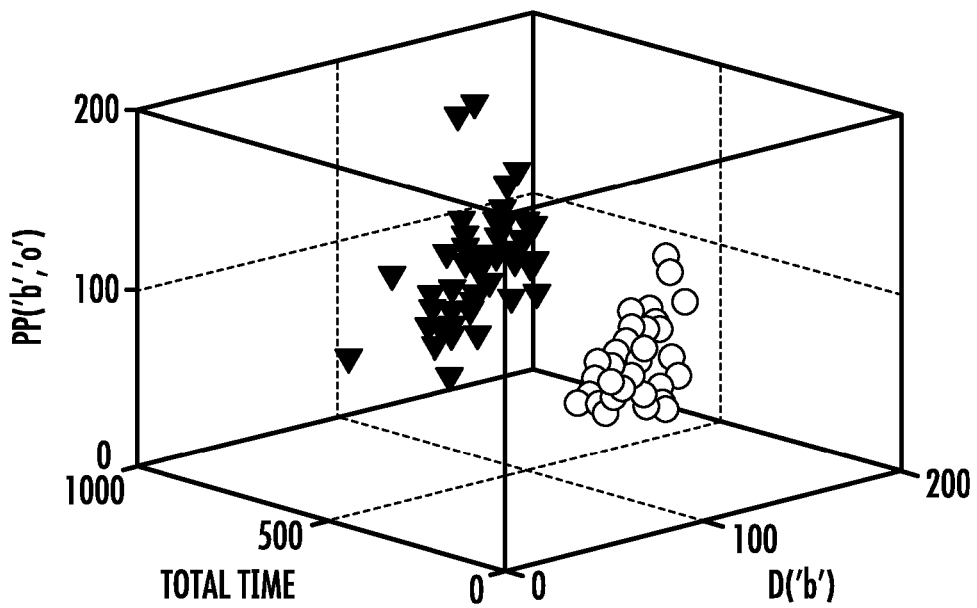
FIGS. 7A to 7F illustrate an exemplary distribution of three keystroke features in milliseconds, in which the first user's data is shown with circles and the second user's data is shown with triangles; in accordance with an embodiment of the present invention.
Figure 7B:
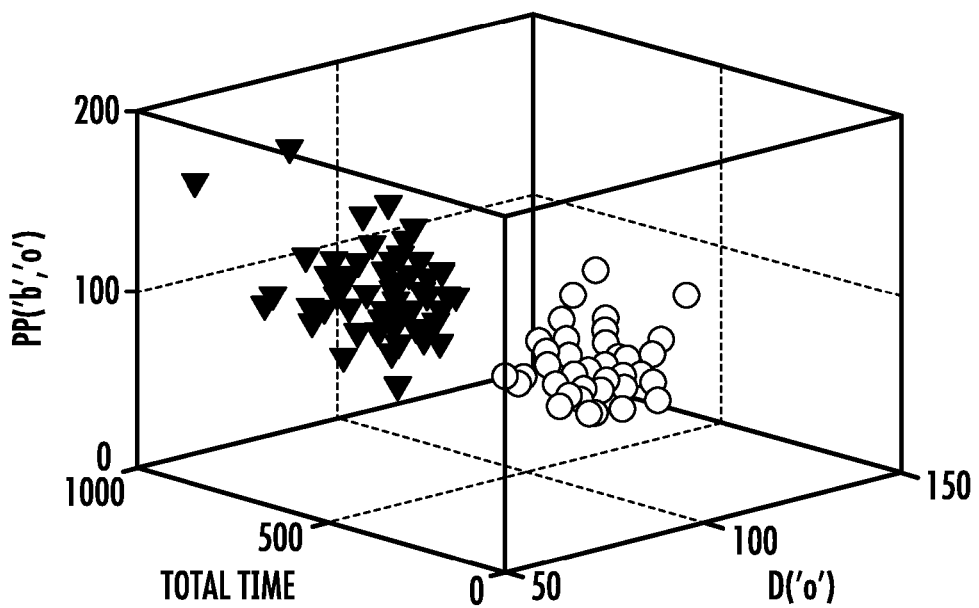
Figure 7C:
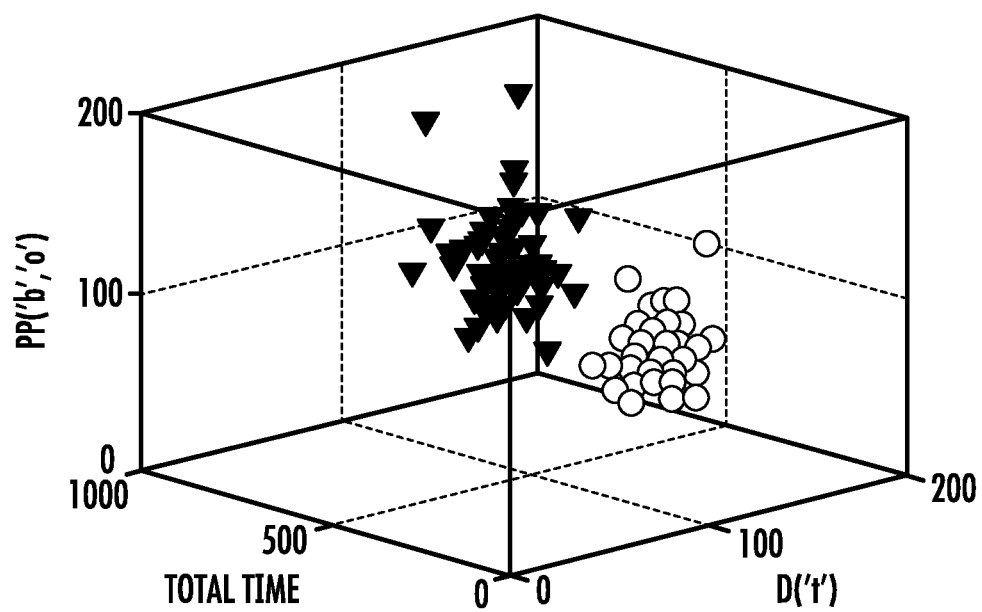
Figure 7D:
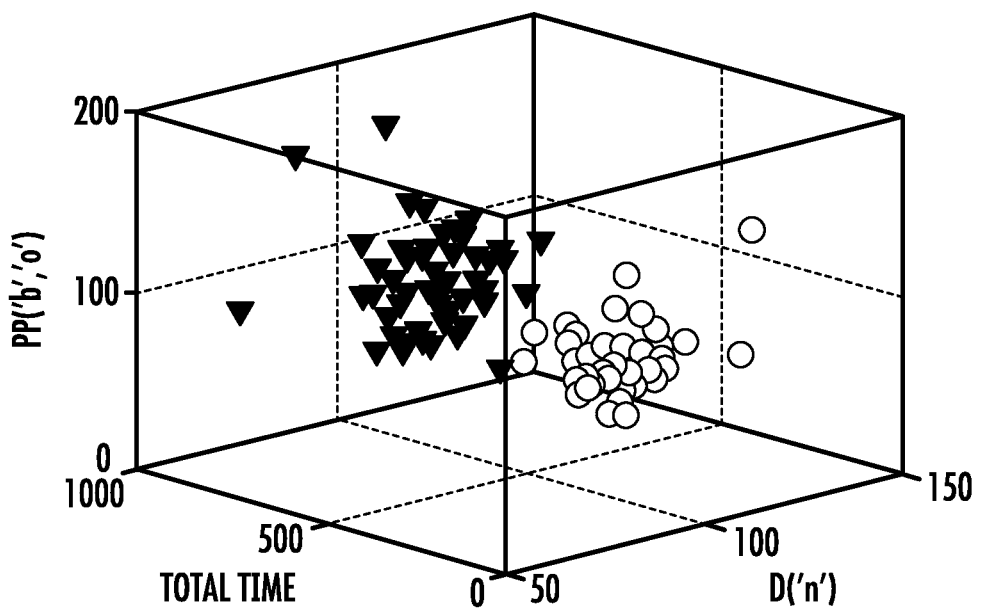
Figure 7E:
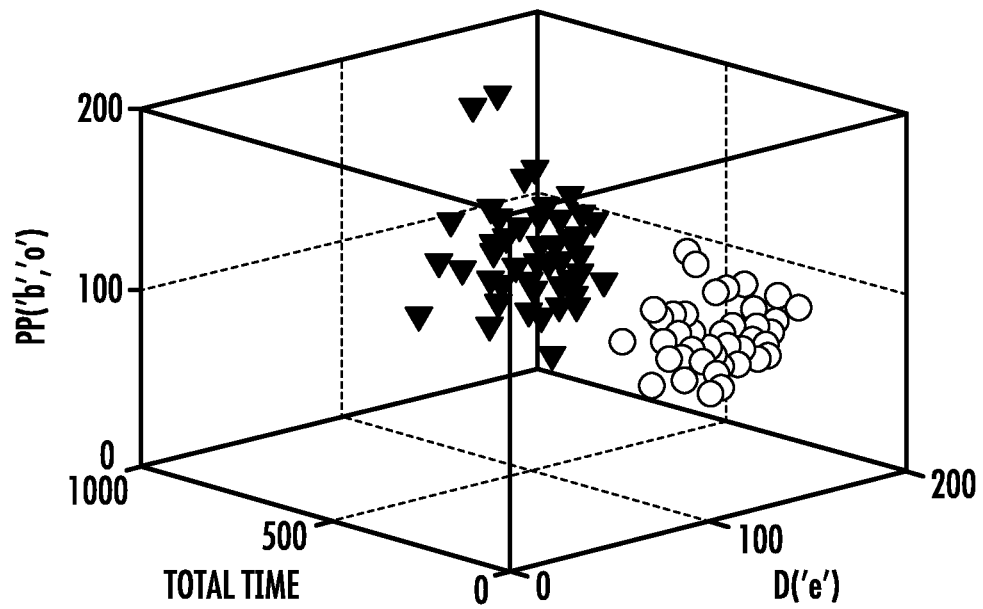
Figure 7F:
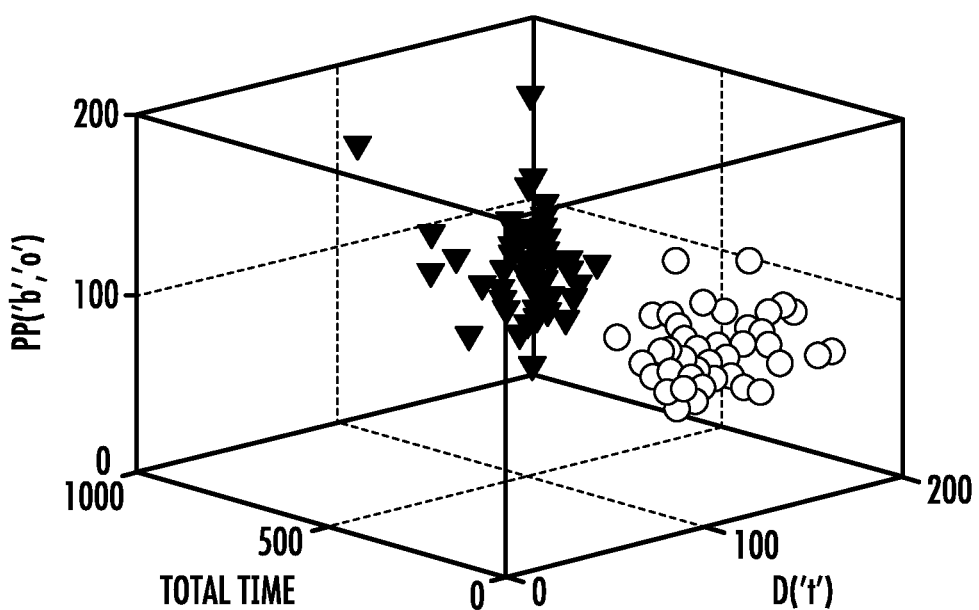

An example is provided in the following to illustrate the high dimensionality of the extracted keystroke features. Letting $x_{i,p}$ and $x_{i,r}$ denote the key press and key release times of the i-th character $x_i$, respectively, a user's typing can be modeled according to a first-order Markov chain as shown in FIG. 4. A bot is only capable of completing event transitions represented in solid lines (positive timing events), but not dashed ones (negative timing events). In comparison, a person can easily create event transitions corresponding to any line shown. Considering the string "www.cooper.edu" that contains N=14 characters, the user-based analyzer 18, 218 extracts the group of features shown in Table 1:

TABLE 1

Illustration of features extracted from keystroke data for the string "www.cooper.edu"

| Feature name | Number of Dimensions | Description |
|---|---|---|
| Total duration | 1 | Time difference between $x_{N,r}$ and $x_{1,p}$ |
| Duration of each character ($D(x_i)$) | 14 | Time difference between $x_{i,r}$ and $x_{i,p}$ |
| Press-to-press time ($PP(x_{i-1}, x_i)$) | 13 | Time difference between $x_{i,p}$ and $x_{i-1,p}$ |
| Press-to-release time ($PR(x_{i-1}, x_i)$) | 13 | Time difference between $x_{i,p}$ and $x_{i-1,r}$ |
| Release-to-release time ($RR(x_{i-1}, x_i)$) | 13 | Time difference between $x_{i,r}$ and $x_{i-1,r}$ |

Dimension Reduction:

As Table 1 shows, even for a short URL such as "ww.cooper.edu", the dimensionality of all possible features is quite high (54, in this case). This high-dimensional feature space makes classification worse if not enough samples are collected, as the model tends to overfit the training data and therefore produce a classification model which incorrectly classifies new data—this problem is common and well known as the overfitting problem in machine learning. The problem arises because the model is very complex and specific to the training set (therefore performing very well on the training data), and not general enough to match (new) unseen instances. Conversely, utilizing a large number of features is desirable because it typically results in a better (more specific) prediction model. As shown in FIGS. 5A-5F, 6A-6F and 7A-7F, the keystroke data from two users are more well-separated as an increasing number of features are used.

The user-based analyzer 18, 218 classification algorithm may use principle component analysis (PCA) to reduce the dimensions of the feature vectors as a preprocessing step. PCA is a known data mining and statistical technique which is commonly used to condense multi-dimensional data to lower dimensions in order to simplify analysis. The premise of PCA is to reduce the dimensions of and transform the original multi-dimensional datasets so that high variations within the data are retained. Experiments show that using PCA may drastically improve the classification accuracy of the program 18, 218, as the sample size may be small compared to the number of features. In the interest of brevity, the following does not report on results performed without PCA transformation.

FIGS. 5A-5F show the distributions of the key durations in the word "botnet" typed by two individuals. Using only a single keystroke feature, such as the key duration in this example, it is shown that distinguishing between the two users using predicate logic would be very unreliable due to the considerable overlapping of the distributions.

Two features are considered in FIGS. 6A-6F; besides the key durations of individual characters, the total typing time of a word are also compared. In FIGS. 6A-6F, by using two keystroke features, the two users' samples are somewhat differentiated from each other, but there still exists significant overlap between the data sets.

In FIGS. 7A-7F, three keystroke features are used to distinguish the two users—the third feature is the press-to-press (PP) time of two adjacent characters, i.e., $PP(x_{i-1}, x_i)$ as defined in Table 1 above. In this example, it is easy to see that the two users' samples are well-separated using a 3-dimensional feature vector. The analysis of this series of data demonstrates the desirability of using multi-dimensional features for classification as used in certain preferred embodiments.

By using a high-dimensional feature vector for classification, embodiments make it difficult for adversaries to successfully simulate keyboard events that pass an embodiment classification test. Humans are imperfect typists and may create negative timing features in a sequence of keystroke events. For example, when typing the string "abc", a user may create negative press-to-release (PR) time by pressing 'c' before having released 'b'. More formally, if $x_{i-1}$='b', $x_i$='c' and 'c' is pressed before 'b' is released then $PR(x_{i-1}, x_i)=x_{i,p}-x_{i-1,r}<0$. From experimental data, it is found that a large number of users have negative press-to-release timings in their datasets. Although an adversary can synthesize arbitrary keystroke events, it is considerably more difficult to create a bot which can inject keystroke events that result in negative inter-key timings.

FIG. 4 illustrates the practical differences in the capabilities between human and bots. Assuming that keystroke events can be modeled accurately by a first-order Markov chain, it is difficult for a bot to simulate certain events, as is the case when negative timing features are present (dashed lines in FIG. 4). When considering higher-order Markov chains, it is even more difficult for the attackers to successfully mimic typing patterns with negative timing; a person may, for example, press 'c' before both 'a' and 'b' are released. Using high-dimensional data may thus lead to higher authentication accuracy and stronger security guarantees. However, if the complexity of the model is increased (e.g., to a second- or third-order Markov chain) it may be desirable to collect additional training instances as to avoid overfitting the data.

Once keystroke features are collected and processed, embodiments may train and classify the data using, for example, support vector machines (SVMs). The use of SVMs may be appropriate as the technique can be used to classify both linearly-separable (i.e., classes which are separable into two or more groups using hyperplanes) and non-linearly separable data. SVMs are known, but by way of a brief explanation, to classify a set of data points in a linear model; support vector machines may select a small number of critical boundary points from each class, which are called the support vectors of the class. Then, a linear function is built based on the support vectors in order to separate the classes as much as possible; a maximum margin hyperplane (i.e., a high-dimensional generalization of a plane) is used to separate the different classes. An SVM model can classify non-linear data by transforming the data instances into a high-dimensional feature space using a kernel function (e.g., polynomial, sigmoid or radial basis function (RBF)) and then performing the maximum-margin separation. As a result, the separating function is able to produce more complex boundaries and therefore yield better classification performance. In a specific embodiment authentication system, the WEKA SVM implementation is employed with a Gaussian RBF kernel. See I. H. Witten and E. Frank, "Data Mining: Practical Machine Learning Tools and Techniques", Morgan Kaufmann, San Francisco, 2d edition, 2005. WEKA is available at http://www.cs.waikato.ac.nz/ml/weka/. Data mining and machine learning literature, such as the above-indicated book by Witten and Frank or by C. Bishop, "Pattern recognition and machine learning", Springer, 2006, may be referred to for detailed descriptions of SVM techniques that may be applicable to various embodiments.

Implementation: Strategy and Details

This section describes the components and details of an embodiment implementation that demonstrates, by way of example, the usability and feasibility of remote authentication based on keystroke dynamics. It includes Remote Data Collection and Attack Simulation and Keyboard Events Injection.

Remote Data Collection

Various key-logging methods, such as for the GNU/Linux operating system, exist; common implementations include userspace programs which monitor privileged I/O ports, kernel modules that hijack the sys_READ and sys_WRITE functions, and kernel modules that hijack the keyboard driver's interrupt handler. However, most of the currently-available keyloggers were not designed with the intention to extract timing information from a user's typing pattern, and require superuser privileges to be installed or used. Addressing these issues and the desire for a platform-independent utility, an embodiment program 18 implemented a keylogger for the X Windows System using the XTrap extension, as illustrated in FIG. 3. It will be appreciated, however, that other implementations for other operating systems are certainly possible.

The X Windows System is a powerful graphical user interface comprising the X server 11, which runs on the machine 10 where the keyboard 17, mouse 13 and screen are attached, and X clients 15, which are common applications (e.g. Firefox, KPDF or XTerm) that can run on either the local machine 10 or a remote machine 200, due to the inherent network capabilities of X11.

One of the capabilities of the XTrap 19 X server 11 extension is to intercept the core input (keyboard 17, mouse 13) events and forward them to XTrap 11 client applications. In this specific embodiment, the client application is a keylogger as part of the user-based analyzer program 18, 218 shown in FIG. 3.

The keylogger in the program 18 contains a callback function which is executed whenever a KeyPress or KeyRelease event occurs. Some supplementary data, such as the current location of the mouse pointer and the name of the current window in focus, may be obtained and formatted to be easily parsed by the feature extractor. Below is an example of the partial output of an embodiment keylogger 18 when typing the word "bot". Some of the features, including the key codes and key symbols were replaced by ellipses for clarity.

(1)  Window=xterm:XTerm|Event=KeyPress| . . . |char=b|screen=0|rootXY=(1236, 370) |root=0|state=0|time=86474468
(2)  Window=xterm:XTerm|Event=KeyRelease| . . . |char=b|screen=0|rootXY=(1236, 370) |root=0|state=0|time=86474562
(3)  Window=xterm:XTerm|Event=KeyPress| . . . |char=o|screen=0|rootXY=(1236, 370) |root=0|state=0|time=86474626
(4)  Window=xterm:XTerm|Event=KeyPress| . . . |char=t|screen=0|rootXY=(1236,370) |root=0|state=0|time=86474683
(5)  Window=xterm:XTerm|Event=KeyRelease| . . . |char=o|screen=0|rootXY=(1236, 370) |root=0|state=0|time=86474692
(6)  Window=xterm:XTerm|Event=KeyRelease| . . . |char=t|screen=0|rootXY=(1236, 370) |root=0|state=0|time=86474785

The output may then be parsed by the feature extractor (as part of the program 18, 218), which contains a small buffer of the last C KeyPress and KeyRelease events. C may be adjusted to match the largest word in the database 20, which may contain words that are used for training and analysis. It will be appreciated that the database 20 may also reside on the remote server 200. Given a database of words $(s_i, i=1, \ldots, M)$ to monitor and feature descriptions (i.e., keystroke durations, total time to type a word, press-to-press times, etc.) of how the strings were typed, when the buffer content from the keyboard 17 input matches a word in the database 20, the features are extracted and again formatted to be easily parsed by the classifier. An example of an embodiment feature extractor output produced by tying the word "bot" 6 times is shown below:

(1)  @word=bot|window=collect.p1:Collect.p1|PP=227, 63|PR=100,-28|RR=191, 92|duration=127, 91, 120|total=410
(2)  @word=bot|window=collect.p1:Collect.p1|PP=190, 56|PR=105,-10|RR=171, 83|duration=85, 66, 93|total=339
(3)  @word=bot|window=collect.p1:Collect.p1|PP=117, 84|PR=32, 9|RR=107, 103|duration=85, 75, 94|total=295
(4)  @word=bot|window=collect.p1:Collect.p1|PP=107, 82|PR=6, -6|RR=94, 83|duration=101, 88, 89|total=278
(5)  @word=bot|window=collect.p1:Collect.p1|PP=123, 130|PR=16, 56|RR=90, 141|duration=107, 74, 85|total=338
(6)  @word=bot|window=collect.p1:Collect.p1|PP=125, 125|PR=5, 31|RR=99, 115|duration=120, 94, 84|total=334

Figure 8A:
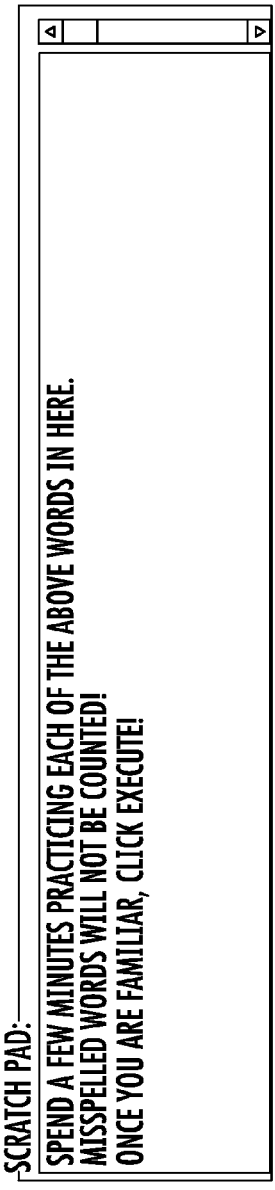
FIGS. 8A and 8B are exemplary screenshots of a data collection graphical user interface before (FIG. 8A) and during (FIG. 8B) recording, in accordance with an embodiment of the present invention.
Figure 8B:
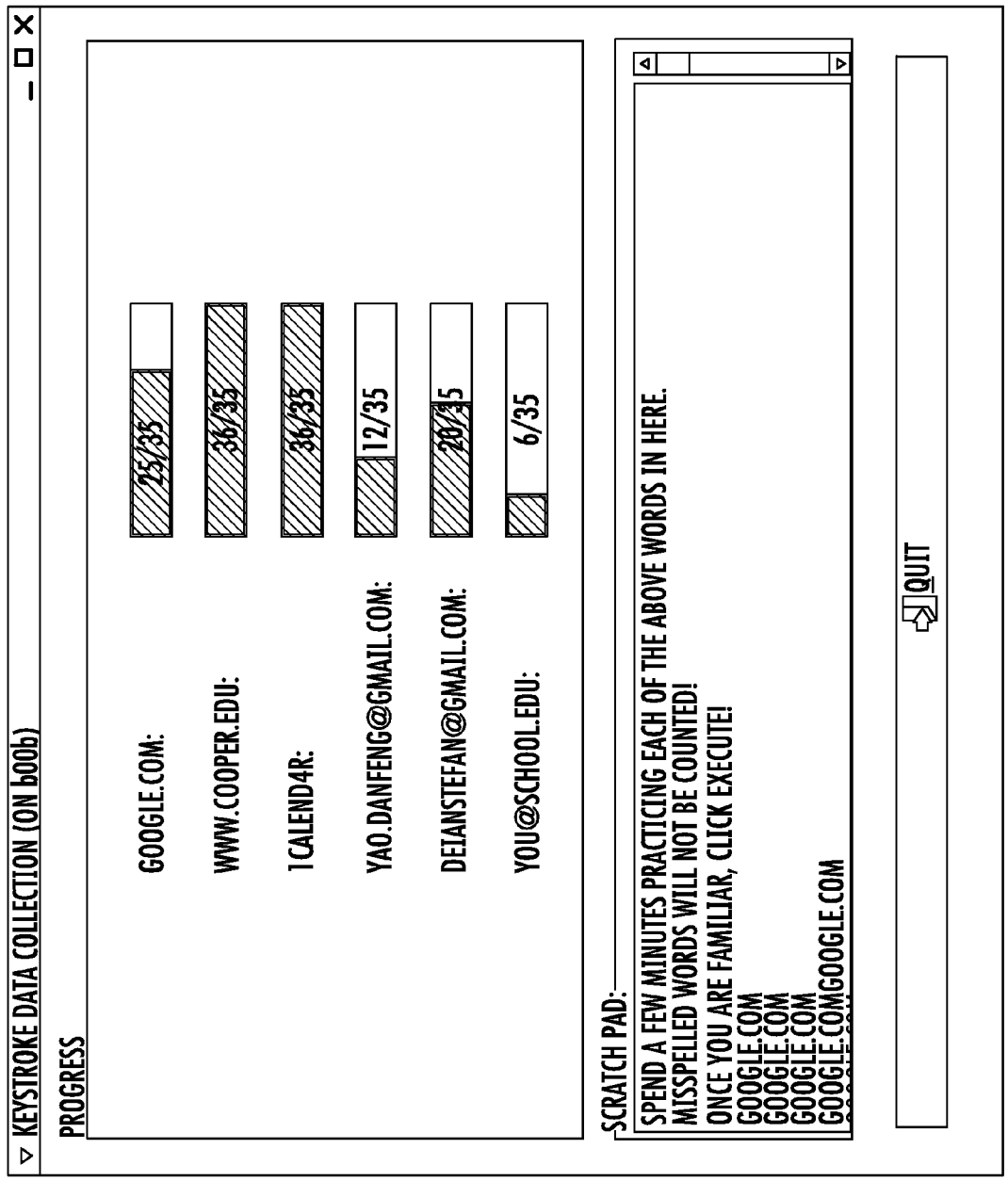

Keystroke timing data was collected from twenty user subjects, ten females and ten males on M=6 different strings. A program was implemented with a graphical user interface (GUI) as a wrapper to the keylogger that records the keystroke dynamics of the participants. Screen shots of the GUI are shown in FIGS. 8A and 8B. The user is asked to type in the following strings, n=35 times each: google.com, www.cooper.com, 1calend4r, yao.danfeng@gmail.com, deianstefan@gmail.com, and the user's own email address. The gender and age of each participant are recorded, as well as their familiarity ('high','medium', or 'low') with each string. This data is later used for analyzing the correlation between demographic data and keystroke dynamics. Before the recording begins, each user has a chance to practice typing each string up to five times each. The study is carried out one user at a time in a controlled environment where the user can concentrate and focus on what he or she is typing. Experimental variables, such as the keyboard, monitor and computer used are also kept constant.

Attack Simulation and Keyboard Events Injection

The goal of an adversary in an embodiment model is to create keystroke events that pass an embodiment classification test. That is, the attacker's fake keystroke events need to be falsely classified as the owner's. To play the devil's advocates, a program may be implemented in, for example, C that injects keyboard events with specific timing information in order to simulate forgeries. An embodiment attack simulator may have two components: a data synthesizer and a typing event injector, which are described next.

To simulate an (intelligent) bot attack, a program may be created to create fake keyboard events and inject them to the X server as if typed on the actual keyboard 17. From the application's (or X client's) perspective, the fake keyboard events cannot be distinguished from actual key events (even though the keyboard is not touched).

As with the keylogger application's use of the XTrap server extension to intercept events, it is also possible to implement an application (a bot) to inject fake events into the X server. To test the performance of a bot injecting fake events two bots were implemented that simulate human typing patterns according to a simplified version of the model shown in FIG. 4. That is, bots which consider only keystroke durations and positive inter-key timings (paths shown by the solid lines in FIG. 4).

The keystroke duration of the ith character in a word was modeled as a random variable $X_i$, where $X_i$ is either:
1. Gaussian with mean $\mu_i$ and variance $\sigma_i^2$: $X_i \sim N(\mu_i, \sigma_i^2)$, or
2. constant with additive uniform noise (mean 0): $X_i \sim \mu_i + U(-\eta_i, \eta_i)$, depending on the type of bot desired, termed GaussianBot or NoiseBot, respectively. The parameter $\mu_i$ is calculated as the mean key duration of the i-th character from selected instances of the user study. For example, to calculate $\mu_1$ for the first character ('1') in the string "1calend4r" we take the 1calend4r instances from the user study and calculate the sample mean and variance of the keystroke durations for the character '1'.

Similarly, the PR inter-key timing feature between the i-th and (i−1)-th character was modeled as a random variable $X_i'$ whose parameters are also calculated from the user study instances.

Algorithms 1 and 2 provided below show the pseudocode for the bots, which inject n instances of the given string. The classification performance of these bots against users are further explained in Section 5.

It is of note that a more complex bot would also consider negative inter-key timing and therefore the full model of FIG. 4 would desirably be implemented. This, however, may also require greater effort from the botmaster, as the order of events would have to be calculated a priori. For example, if the bot were to correctly simulate the word "botnet" typed by a person, the probability of injecting a KeyPress event for the character 'o' before injecting a KeyRelease event of 'b' would have to be considered and therefore Algorithms 1 and 2 would likely have to be modified dramatically.

```
Algorithm 1: GaussianBot simulation of a human input:    string={x_1, x_2, ..., x_N}
          durations={(μ_1, σ_1), (μ_2, σ_2), ..., (μ_N, σ_N)}
          inter-key timing={(μ_2',σ_2'), (μ_3',σ_3'), ..., (μ_N',σ_N')}
          n=number of words to generate
1 for n ← 1 to n do
2    for I ← 1 to N do
3       SimulateXEvent(Key Press, x_i);
4       X_i ← N(μ_i,σ_i^2);           /* key duration */
5       if X_i < 0 then X_i ← 0;       /* adjust for large variance */
6       Sleep(X_i);
7       SimulateXEvent(KeyRelease, x_i);
8       X_i ← N(μ_i',σ_i');            /* inter-key timing */
9       if X_i' < 0 then X_i' ← 0;
10      Sleep( X_i');
```

Similar to Algorithm 1 presented above, the pseudocode for a bot which generates noisy instances (i.e., mean±noise) is shown below in Algorithm 2 below. The parameters for Experiment 3 discussed below were calculated as those for GaussianBot in Experiment 2, also discussed below, with the noise parameters $\eta_i = \sigma_i/2$ and $\eta_i' = \sigma_i'/2$.

```
Algorithm 2: NoiseBot simulation of a human input:    string={x_1, x_2, ..., x_N]
          durations= {(μ_1, η_1), (μ_2, η_2), ..., (μ_N, η_N)}
          inter-key timing={(μ_2',η_2'), (μ_3',η_3'), ..., (μ_N',η_N')}
          n=number of words to generate
1 for n ← 1 to n do
2    for I ← 1 to N do
3       SimulateXEvent(KeyPress, x_i);
4       X_i ← μ_i + U(-η_i,η_i);       /* key duration */
5       if X_i < 0 then X_i ← 0;  /* adjust for large noise */
6       Sleep(X_i);
7       SimulateXEvent(KeyRelease, x_i);
8       X_i ← μ_i' + U(-η_i',η_i');    /* inter-key timing */
9       if X_i' < 0 then X_i' ← 0; /* adjust negative timing */
10      Sleep( X_i');
```

User-Based Analyzer Experimental Results

Data analysis and classification tools used in the following, including those for principle component analysis and support vector machines, are from WEKA as indicated above. WEKA is a widely-used open-source data mining toolkit written in Java. The graphical user interface provided by WEKA, Knowledge Flow, makes the tool user-friendly to researchers.

Experiment Methodology

Three sets of experiments were performed to test the feasibility and the performance of the user-based analyzer 18, 218 in classifying keystroke timing features. The setup of the experiments is illustrated in Table 2 below:

TABLE 2

The setup of three series of experiments

| # | Experiment series | Purpose | Tests on Gender |
|---|---|---|---|
| 1 | Human vs. Human | To distinguish between two users | Yes |
| 2 | Human vs. GaussianBot | To distinguish between a user and a GaussianBot (Algorithm 1) | No |
| 3 | Human vs. NoiseBot | To distinguish between a user and a NoiseBot (Algorithm 2) | No |

For the above Table 2, the following strings were evaluated in all experiments: www.cooper.edu, 1calend4r, deianstefan@gmail.com. For human vs. human experiments, a separate analysis was also performed on different gender groups and additional strings were also evaluated: google.com and yao.danfeng@gmail.com.

The purpose of Experiment 1 is to confirm the ability of embodiment programs 18, 218 to distinguish different individuals' keystroke patterns with good prediction results, as has been shown in the existing literature. However, existing literature on keystroke authentication does not provide any analysis of attacks that are based on statistical and synthetic keystroke timing; it is believed that there are currently no bots which are able to perform the attacks that are considered herein. Therefore, by playing devil's advocate, two sets of experiments were designed to simulate some sophisticated bot attacks. The purpose of this is to evaluate the robustness of keystroke analysis against artificially and statistically created sequences of events. As auxiliary information for the attacker, the adversary is given access to the keystroke data of all nineteen users excluding the owner's data. To see whether gender plays a role in the robustness of keystroke analysis, separate group analyses were also performed based on the genders of the participants. The experimental results are presented below.

Experiment 1

Human vs. Human

Among the twenty users, a basic SVM test was set up to see if an embodiment classification algorithm can distinguish each from the others. Three different classification sets $c_i$, i=1, 2, 3 for each word were created according to the users' gender: $c_1$={all male instances}, $c_2$={all female instances}, and $c_3$ which is the union of $c_1$ and $c_2$. The class i experimental setup of word $s_l$ for user $u_j$ was then performed as follows:
  Label each of the user's 35 instances as owner,
  Pick 5 random instances for every user $u_k \neq u_j$ whose instances are in the set $\{c_i\}$ and label them as unknown,
  Given the relabeled instances, perform a 10-fold cross-validation for SVM classification (in which the model parameters may be manually adjusted) as described in Section 3,
  Calculate the average true positive (TP) and false positive (FP) rates; where the TP rate is the ratio of the number of owner instances correctly classified as owner and the FP rate is the ratio of the number of unknown instances falsely classified as owner.

The classification analysis was repeated for all the user subjects, words in the database and classification sets. Finally, the average TP and FP rates for every word and class (1. male, 2. female, and 3. both) were calculated and the results are summarized in Table 3—The average false positive rate of 4.2% confirms the robustness of using keystroke dynamics for authentication.

TABLE 3

Human vs. human true positive(TP) and false positive (FP) SVM classification results

| String | Female | | Male | | Both | |
| --- | --- | --- | --- | --- | --- | --- |
| | TP | FP | TP | FP | TP | FP |
| google.com | 93.68% | 5.56% | 92.00% | 5.50% | 91.86% | 4.53% |
| www.cooper.edu | 94.00% | 4.46% | 94.71% | 4.62% | 91.71% | 2.89% |
| 1calend4r | 92.29% | 5.69% | 92.57% | 7.51% | 89.29% | 4.48% |
| yao.danfeng@gmail.com | 96.26% | 2.90% | 95.14% | 3.17% | 94.00% | 2.26% |
| deianstefan@gmail.com | 95.29% | 3.68% | 96.00% | 2.90% | 94.43% | 2.79% |

In general, the performance across the different classes had little effect on the performance of the SVM classifier. Familiarity and length may affect the results, however. From Table 3 it is seen that less familiar strings such as "1calend4r", have a lower true positive rate than the more familiar strings, like "www.cooper.edu". This is because the user is still not very comfortable with the string and the variance (which in this case may effectively be considered noise) in the feature vectors is quite high.

On average, the true positive and false positive rates of the longer strings ("yao.danfeng@gmail.com" and "deianstefan@gmail.com") may perform better because the users have an additional "freedom" to demonstrate their unique typing style; this may be because the strings are very long and some users pause (unconsciously) mid-word, which is reflected by some of the inter-key timings.

Experiments 2 & 3

Human vs. Bots

The SVM classification procedure for the bot experiments is similar to that of Experiment 1, however only ten user cases and M=3 strings are used, with more focus on tweaking the model parameters. The chosen strings ($s_j$, j=1, ... M) included a URL ("www.cooper.edu"), an email address ("deianstefan@gmail.com") and a password ("1calend4r"). As explained in the previous section, the gender classes only affect the results very slightly, and therefore only the $c_3$ class was considered for Experiments 2 and 3. The setup for Experiment 2, for word $s_j$ of user $u_j$ was performed as follows:

Label each of the user's 35 instances as owner,

For each character $x_i$, i=1, ... N in string $s_j$, calculate the parameters $\mu_i$ and $\sigma_i$, and similarly the average and standard deviation of the press-to-release times ($\mu_i'$, $\sigma_i'$) using the remaining users ($u_k \neq u_j$) instances, Using the parameters as arguments for GaussianBot, Algorithm 1, generate n=35 bot instances and label them unknown Perform a 10-fold cross-validation for SVM classification using the owner and unknown data sets, Calculate the average TP and FP rates.

TABLE 4

Human vs. bots SVM classification results.

| | GaussianBot | | NoiseBot | |
| --- | --- | --- | --- | --- |
| String | TP | FP | TP | FP |
| www.cooper.edu | 96.29% | 2.00% | 100.0% | 0.00% |
| 1calend4r | 93.74% | 3.43% | 97.71% | 1.43% |
| deianstefan@gmail.com | 96.57% | 1.71% | 99.71% | 0.29% |

The procedure for Experiment 3 was the same, using instead Algorithm 2, NoiseBot, as explained above. Table 4 above shows the results of Experiments 2 and 3. The successes of the GaussianBot and NoiseBot in breaking the model are negligible, as indicated by the extremely low (average 1.5%) false positive rates. Furthermore, these experiments support the results of Experiment 1 and confirm the robustness of keystroke authentication to statistical attacks.

User-Based Analyzer Integrity Service to Prevent Fake Event Injection

To further improve the robustness of the user-based analyzer 18, 218, in particular to prevent attackers from tampering with the user-based analyzer 18, 218 and injecting fake keystroke events into the user-based analyzer 18, 218, program code implementing an integrity service may be added to the user-based analyzer code 18, 218. One embodiment method is based on lightweight cryptographic functions and leverages known on-chip Trusted Platform Modules (TPMs) for key management.

TPM itself may not be enough for preventing the injection of fake key events, as that such attacks can originate from the application level and may be beyond kernel-level security. For example, any X application can inject events without having to do anything with the keyboard driver. TPM is useful in addressing kernel and root-level attacks. In comparison, an embodiment integrity service 18, 218 also addresses the application level attacks efficiently. An existing approach (e.g., in SATEM, as disclosed by G. Xu, C. Borcea, and L. Iftode in "Satem: Trusted service code execution across transactions", Reliable Distributed Systems, IEEE Symposium on, 0:321-336, 2006) to prevent application-level attacks, e.g., substituting libraries with compromised versions, is to have kernel libraries as part of the trusted system that gets loaded and attested by TPM. In comparison to the SATEM approach, an embodiment architecture is more specific to key event integrity and thus is simpler. Embodiments may only attest the kernel and prevent module re-loading. In a preferred embodiment, two communication channels to the remote user-based analyzer server 200 are provided, one from the application 18 and the other from a trust device that is part of the kernel which is attested using the TPM. If an attacker tampers with user-based analyzer 18, the remote server 200 can notice mismatches in the information sent from the two channels. An embodiment architecture is presented in detail in the following.

Architecture of User-Based Analyzer Integrity Service

Figure 9:
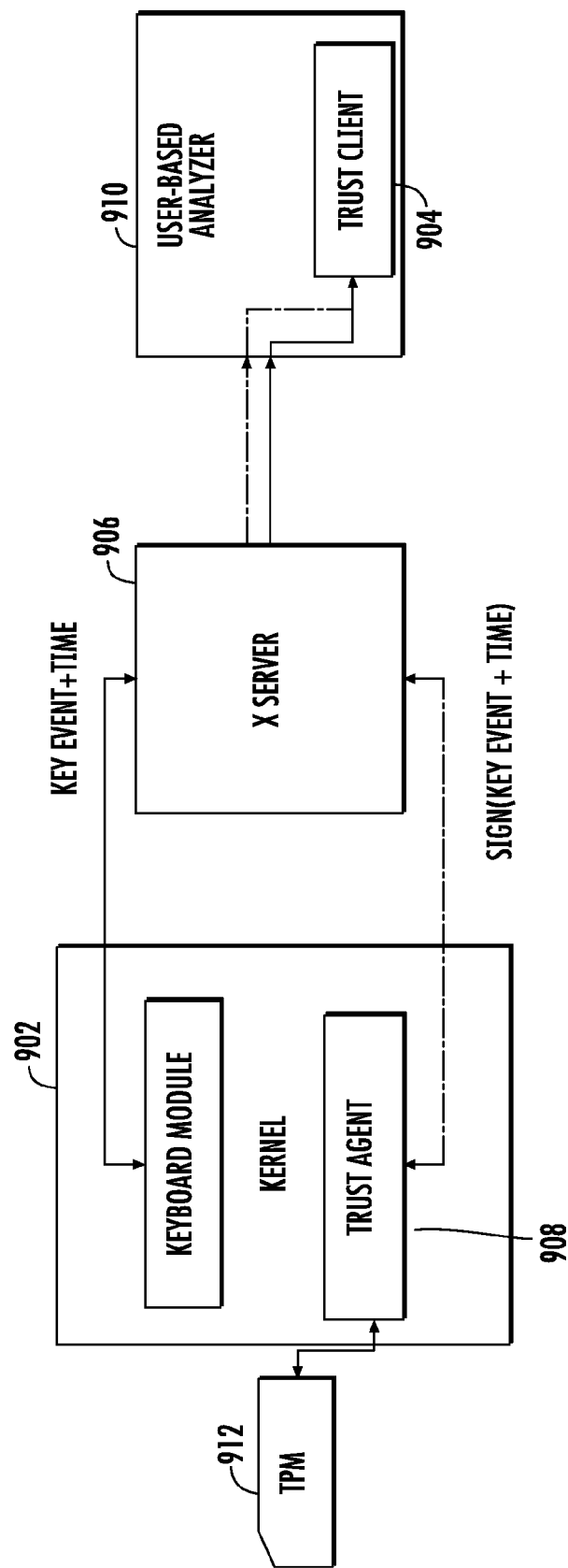
FIG. 9 illustrates an exemplary architecture of a user-based analyzer integrity service, in accordance with an embodiment of the present invention.

An embodiment user-based analyzer integrity service 18, 218 is implemented by expanding the basic user-based analyzer prototype in the following aspects. Code 18, 218 is provided that realizes a trust agent in kernel and a trust client in the user-based analyzer. The trust client may be a simple program that parses the non-encrypted messages and forwards them accordingly between the kernel-level trust agent and remote server 200. Cryptographic functions are provided on key events, including signing key events by the trust agent and verifying key events by the remote user-based analyzer server 200. The encryption and decryption functions are also provided on the packets from the user-based analyzer client 18 to the remote server 200 to prevent network snooping of keystrokes. Last but not least, a key management mechanism is provided for the integrity service that leverage TPM key stores, which is described in Section 6.2. A schematic drawing of an embodiment user-based analyzer integrity service architecture is shown in FIG. 9.

One embodiment implementation integrates a TPM emulator that provides a realistic environment for interacting with the trusted kernel and modules without spending significant developing time on standard TPM implementation; this may be done, for example, for testing and verification purposes. With such an embodiment it is confirmed that the Guassian-Bot and NoiseBot that inject X-layer fake events are recognized as rogue. It will be understood, however, that preferred embodiments may be implemented with actual TPM modules.

The following describes the detailed procedure of starting and running an embodiment integrity service between the client 10 and the remote server 200. A schematic drawing of the integrity service architecture is shown in FIG. 9. Although discussed below with specific reference to X Windows system, it will be understood that other embodiments may be developed for other types of systems.

Trusted Boot:

A kernel module, which may be called the trust agent, is loaded on boot or compiled in the kernel 902. The module creates a device /dev/cryptkbd. Embodiments disable /dev/mem and /dev/kmem and module loading after boot. A user-space trust client 904 opens device /dev/cryptkbd and opens a socket to the trusted server 906 and waits for communication. When the trust client opens /dev/cryptkbd, the trust agent 908 verifies the signature of the trust client 904 and prevents any other program from opening the device.

Initial Authentication:

When the remote server 200 gets a connection from a user-based analyzer client 910, it requests the initial authentication. The trust client 904 on the user-based analyzer client 910 uses ioctl (a Linux command to control the underlying device parameters) requesting the required information from the agent 908. The trust agent 908 forwards TPM registers 912 and trust client signature, both signed using the TPM key (See Section 6.2). The trust client reads from the agent and forwards the information to the user-based analyzer server 200. The user-based analyzer server 200 verifies the information.

Key Exchange and Monitoring:

The trust agent 908 and the remote server set up a shared key through a known RSA key exchange protocol based on the TPM keys (See Section 6.2 for details). When the user-based analyzer server 200 requests a user-based analyzer challenge, i.e., requiring the user to type in a specific string, the trust agent 908 forwards the encrypted and signed keystroke events to the trust client 904. The trust client 904 then simply forwards the events to the remote server 200, who verifies the integrity of the events. If signatures associated with events do not pass the server's verification, the trust client 904 is notified. The user-based analyzer server 200 may also perform timing-based authentication analyses as desired.

The embodiment aforementioned protocol describes a general approach that can be used for attestation of other devices. In particular, it can be easily generalized to prevent bots from injecting fake events into other applications as well, e.g., into a browser. It may be necessary to expand the TPM support for the applications to be protected. To that end, a trusted wrapper can be written so that a browser, or login, virtual network computing (VNC) application or the like interfaces with the trust client and verifies the events. Such variations, however, should be routine for one of ordinary skill and thus do not require any further detailed description.

Key Management in a User-Based Analyzer Integrity Service

This section shows an embodiment key management mechanism used in an embodiment integrity service for user-based analyzer. When a user wants to use the user-based analyzer service, they use the TPM to create two private/public RSA keys: a binding key, and an identity key. The binding key is used to securely store the symmetric keys used for signing and encryption, while the identity key is used to sign the TPM quote. A TPM quote contains the machine state. Key exchange or quote signing may follow the following procedure.

1. A key exchange or quote is requested by the client and the server.

2. The client uses the TPM to generate two random strings ($a_0, a_1$). The client generates a TPM quote and uses the identity key to sign it. The generated data of this step are encrypted using the server's public key.

3. The server generates two random strings ($b_0, b_1$) and encrypts them using the client's public key.

4. Server and client exchange random strings and XOR the received bits with the sent bits to use as two symmetric keys (e.g., $a_0$ XOR $b_0$, $a_1$ XOR $b_1$), using one key for signing, and the other for encryption. The server verifies the TPM quote. When the client disconnects, the binding key may be used to wrap the symmetric keys and securely store them so the key exchange is not required during the next connection; the server may request a new key exchange when necessary (after a certain number of messages are exchanged). To assure a trusted boot, kernel, etc. the key generation procedure may be repeated during every connection.

The Network-Based Analyzer: Detection of Backdoor Bot Traffic Through User-Input Event Correlation Analysis of Processes The above has shown that (1) keystroke authentication in a client-server architecture is a robust mechanism for distinguishing human users from bots; and (2) embodiment integrity verification mechanisms prevent bots from injecting fake keystroke events into computers. This section presents a novel detection technique that identifies suspicious bot processes by analyzing the correlations between network traffic and input events of the processes.

The goal of bot traffic detection is to identify suspicious network activities that belong to botnets and block them. The operations of botnets crucially depend on the bots' abilities to constantly communicate with the outside world, for the purposes of receiving commands from botmasters, launching attacks, and exporting data. Thus, monitoring host going traffic is a powerful mechanism to detect suspicious backdoor traffic. This backdoor traffic is typically disguised as legitimate traffic, such as HTTP or SMTP messages, which makes detection challenging. By focusing on human behavior factors, namely user inputs events and their correlation with network applications, embodiments are able to design a robust and reliable mechanism to identify suspicious network packets. An specific embodiment method by way of example is described in detail next.

It is noted that the that legitimate network activities of human users typically are initiated by their keyboard or mouse input events, whereas bot traffic is not. For example, human users send emails after typing the messages, or copy-and-paste operations that involve either keyboard or mouse activities. Human users send HTTP requests by typing URLs into browsers or clicking hyperlinks or selecting bookmarks. One embodiment approach for identifying suspicious bot traffic is to monitor both the network interface and input devices, such as keyboard 17 and mouse 13, of a host 10 and to carry out a correlation analysis between the user input events and network activities. Thus, outgoing traffic initiated by bots can be identified as it is not associated with any input events in the correlation analysis.

Embodiment methods and their related systems solve two important problems in this section:

Given an outgoing network packet, how does one identify and verify the source application that generates the traffic? This problem may be termed provenance verification of network packets.

Given the network packets with their provenance verified and given the user input events, how does one classify legitimate packets from suspicious ones?

To answer the first problem, embodiments develop a robust provenance verification mechanism using lightweight cryptographic tools. For the second problem, embodiments record the destination application of user inputs (i.e., the application that receives the input events) and use a time-based analysis to classify the traffic.

The overwhelming majority of malware exploits and targets the Windows® operating system. Yet, the majority of advanced security solutions are developed in the Linux operating system, as Windows® operating system is less documented yet more complex. Thus, preferred embodiments implement and demonstrate a network-based analyzer system in Windows®. It will be appreciated, however, that such embodiments may be generalized to other operating systems, such as the Linux operating system, which should be routine for one of ordinary skill after having the benefits of the instant disclosure. It will be further appreciated that embodiment network-based analyzers may be implemented as part of the program code 18, 218.

Background on Existing Network Filtering Architectures

Figure 10:
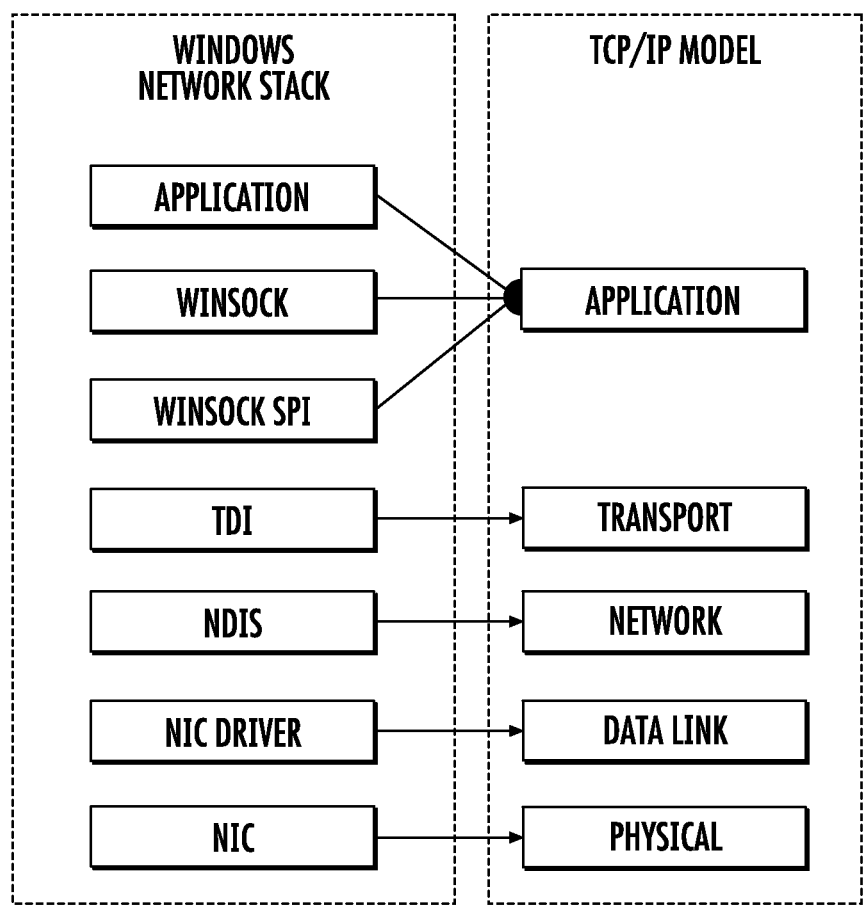
FIG. 10 illustrates an exemplary mapping of a Windows® Network Stack to a standard TCP/IP stack model, in accordance with an embodiment of the present invention.

First, a brief introduction on existing personal firewalls in Windows® operating systems is provided, in particular, on the network packet filtering architecture. The Windows® network stack can be mapped to the OSI 7-Layer structure, or to a 5-layer structure as shown in FIG. 10. A good introduction on the security and firewall implementation in Windows® is provided by, for example, C. Ries, in "Inside windows rootkits", 2006, VigilantMinds.com, Whitepaper, and in "A lil'bit about NDIS, Windows Firewall and the undocumented Firewall-Hook Drivers Interface", available at http://www.haxorcize.com/?p=28.

Most Windows® personal firewalls work in the Winsock Stateful Packet Inspection (SPI), Transport Driver Interface (TDI) and Network Driver Interface Specification (NDIS) layers. The Winsock SPI layer can be easily bypassed if malicious code directly access TDI devices and interfaces. Thus, advanced firewalls usually do not use Winsock SPI. TDI is used extensively in current user-based protection solutions. In this layer, firewalls can learn which process is sending or receiving which packets. There are two ways to realize TDI-layer filtering. One is to attach a filter TDI driver and let the driver filter all the network traffic. However, a Windows® rootkit can detach this driver simply. The other way is to hook into a TDI TCP/IP driver. This technique is undocumented by Microsoft® and some reports show that this approach may cause unexpected system crashes. The problem with TDI-level filtering is that it can be bypassed easily, which may make the whole firewall useless.

In comparison to the Winsock SPI and TDI layers, the NDIS layer is the most desirable and secure place to perform packet filtering. The NDIS layer can capture all the network traffic, which means that virtually all network traffic needs to pass this layer. It is very hard to bypass firewalls in the NDIS layer, unless the firewall is turned off.

Network-based Analyzer Architecture, Key Management, Lazy Detection, and Inputs-Traffic Correlation Analysis As mentioned earlier, virtually all user-initiated outbound traffic is associated with a particular application, whereas bot traffic (e.g., HTTP messages) typically are not. Thus, given some outbound network packets, one needs to identify and authenticate their provenance. However, given a packet at the NDIS layer, it may be impossible to retrieve the source application that generates it, i.e., the provenance of the packet, as the process information is lost. To solve that problem, an embodiment approach utilizes both the TDI (for process information) and NDIS (for network packets) to detect or block malicious attacks. By comparing the views at those two network interfaces, embodiments are able to identify suspicious traffic that bypasses the application layer or the transport layer of the network stack, which is a type of behavior common in malware, e.g., bots, rootkits and adware.

Figure 11:
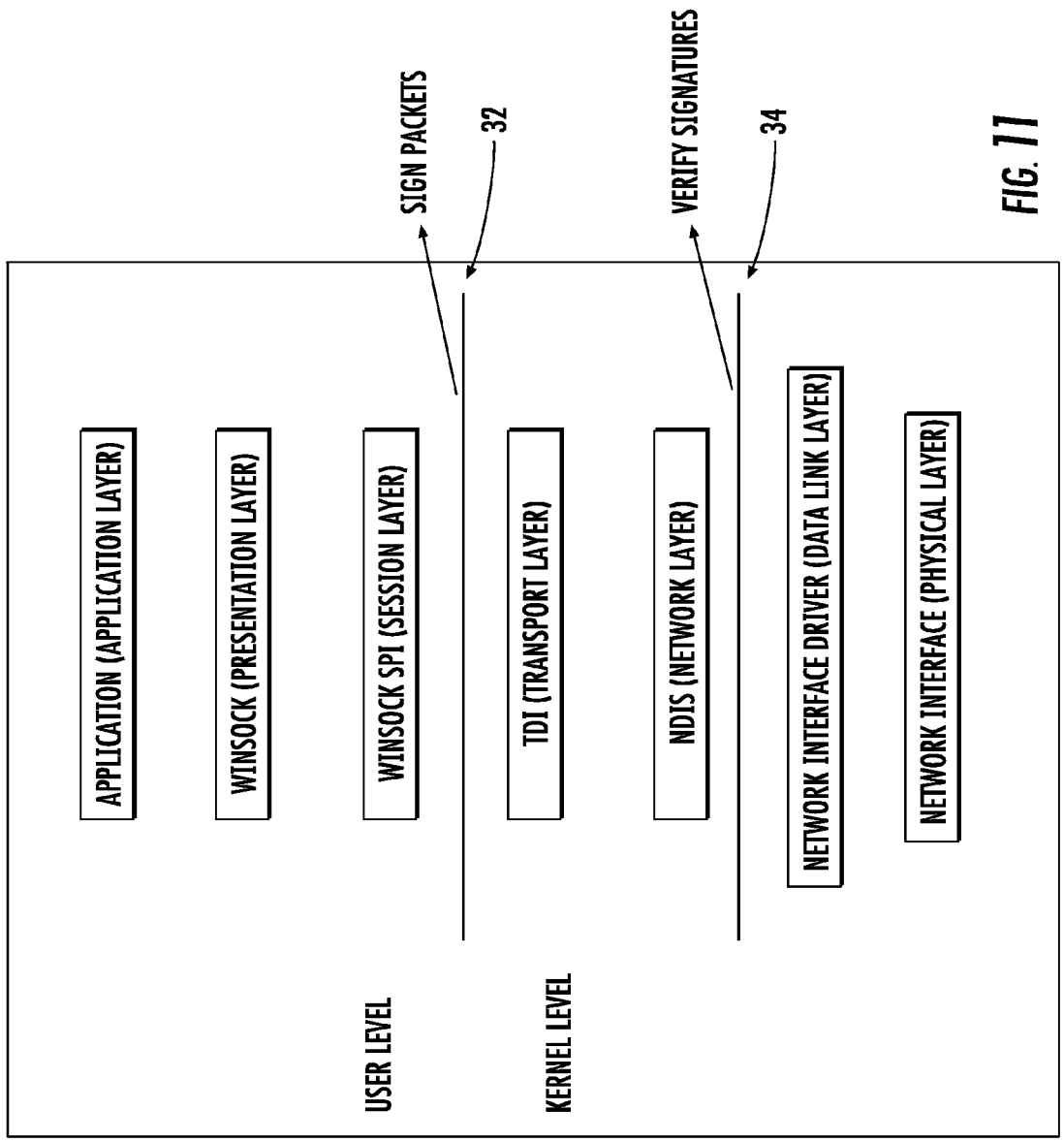
FIG. 11 illustrates an exemplary network stack used in the Windows® operating system and shows how an embodiment network-based analyzer provides a provenance verification mechanism for outbound traffic by signing and verifying packets (represented by arrows) as packets proceed through the network stack, in accordance with an embodiment of the present invention.

Embodiments may use a lightweight digital signature scheme to ensure that all network packets must go through the network stack. As shown in FIG. 11, in an embodiment network-based analyzer, outbound packets are signed at the TDI layer with a secret key known to the network-based analyzer. The operation may be equivalent to computing the MAC code on the packet digest. Then, at the NDIS layer, the signatures are verified with the same secret key by the network-based analyzer. If there are any packets originating from no known applications obtained from the process table, then network-based analyzer identifies and labels them as suspicious. These packets are likely generated by stealthy bots.

Figure 12:
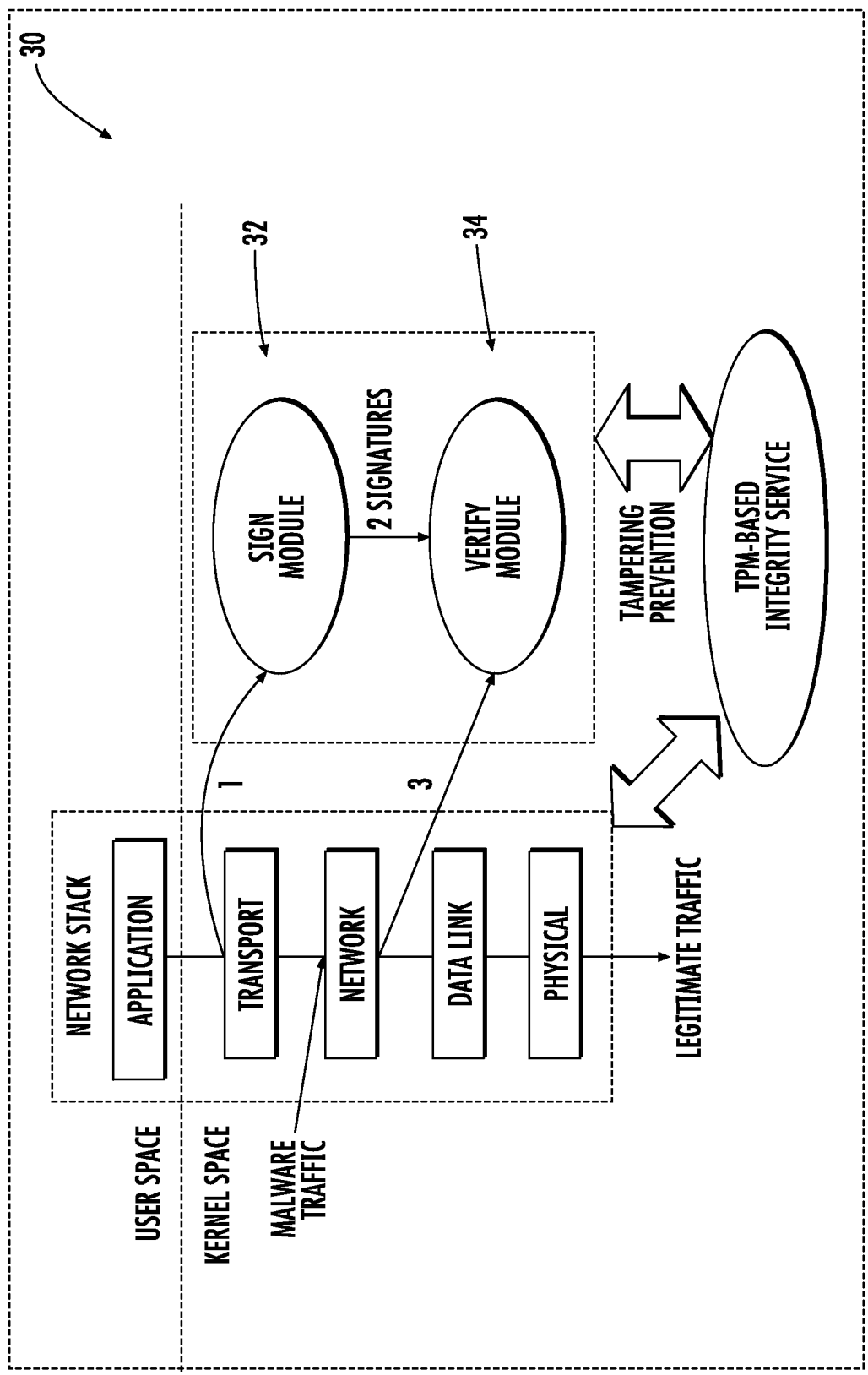
FIG. 12 illustrates an exemplary network-based analyzer architecture, in accordance with an embodiment of the invention.

An embodiment network-based analyzer 18, 218 may be an add-on to the host's network stack. It may include a Sign Module 32 and a Verify Module 34, as shown in FIG. 12. The Sign Module 32 may be at the upper edge of the transport layer while Verify Module 34 may be at the lower edge of the network stack layer. All legitimate network packets pass through Sign Module 32 first and then the Verify Module 34. The Sign Module 32 signs every packet and sends encrypted signatures as packet provenance information to the Verify Module 34, which later verifies them. If the signatures of the packets cannot be verified, then they may be labeled suspicious, since they bypass the Sign Module 32, and are likely generated by stealthy malware. To ensure that the integrity of the network-based analyzer 18, 218 framework and signing key secrecy, the network-based analyzer 18, 218 leverages the on-chip TPM to derive signing keys and to attest kernel integrity at boot along with the network-based analyzer 18, 218 modules.

An embodiment key management mechanism may be similar to the one used in the user-based analyzer integrity server described in Section 6.2. The following provides a specific embodiment example.

The network-based analyzer 18, 218 protocol may have three main operations: SYSTEM BOOT, SIGNING KEY EXCHANGE, and SIGN AND VERIFICATION.

System Boot:

The Verify Module 34 starts first. It randomly generates a public/private key pair.

The Sign Module 32 then starts. It also randomly generates a public/private key pair.

Signing Key Exchange:

The Sign Module 32 contacts the Verify Module 34 and they exchange their public keys. The Sign Module 32 generates two random strings $a_0$ and $a_1$ and encrypts $a_0$ and $a_1$ using the public key of the Verify Module 34. The Sign Module 32 sends encrypted $a_0$ and $a_1$ to the Verify Module 34.

The Verify Module 34 receives and decrypts $a_0$ and $a_1$ with its private key. It then generates two random strings $b_0$ and $b_1$.

The Verify Module 34 encrypts $b_0$ and $b_1$ using the public key of the Sign Module 32. The Verify Module 34 sends encrypted $a_0$ and $a_1$ to the Sign Module 32.

The Sign Module 32 receives and decrypts $b_0$ and $b_1$ using its private key.

Both Sign and Verify Modules have $a_0$, $a_1$, $b_0$, and $b_1$. They compute the signing key as $a_0 \oplus b_0$ and the symmetric key for their communication encryption as $a_1 \oplus b_1$.

Sign and Verification (Shown in FIG. 12)

The Sign Module 32 gets network packet data from the application layer and generates a signature for the data using the UMAC.

The Sign Module 32 encrypts the signature and packet information (like source and destination addresses and ports) with the communication key.

The Sign Module 32 sends the encrypted data to the Verify Module 34. The Verify Module 34 receives and decrypts the signature and packet information. It inserts them into a hash table indexed by the packet information.

The Verify Module 34 intercepts every network packet just before it is sent to the network interface card and calculates its signature. The Verify Module 34 searches the hash table according to the packet information. If it can find a signature match, the corresponding packet is allowed to be passed down to the network interface card, because this packet has already gone through the whole network stack and been checked by Sign Module 32. Otherwise, the Verify Module 34 rejects the packet or raises an alarm to the user.

As shown in FIG. 11 and as indicated earlier, in one embodiment the Sign Module 32 may be realized as a TDI filter device at the upper edge of the transport layer in the Windows TCP/IP stack. All legitimate network packets from Winsock APIs are captured and signed by Sign Module 32. The Verify Module 34 may be an NDIS intermediate miniport driver at the lower edge of the network layer. It intercepts and verifies all packets just before they are sent to network interface card drivers.

By way of a highly-specific embodiment particularizing the above, the Sign Module 32 may be based on an open-source firewall, such as provided by the TDIFW project, available at http://tdifw.sourceforge.net/. This firewall has two components. One is a Windows service in user space. It is the interface to the firewall. Users can use this service to stop or start the firewall, to change firewall rules, and to log network activities.

The other component is a TDI filter device in the kernel space. It is a Windows kernel driver and can filter all network traffic from the application layer. The function tdi_send in disp_sr.c may be of interest. This function intercepts outbound network packets including UDP datagrams and TCP segments before they are handled to the TCP/IP stack. It is worth mentioning that all TCP control messages such as syn, fin, ack are not captured because they are generated by the TCP/IP stack which is below the filter device. Besides data, source and destination addresses and ports are known. Process ID can also be learned by calling PsCurrentProcessID, since the filter driver works in the context of the process which is calling Winsock APIs to send outgoing packets.

The specific embodiments changes tdi_send. First, all TCP segments are captured whose destination port is 80. Then, the signature is calculated for each segment. Signatures are finally sent directly to the Verify Module 34 through the system call IoCallDriver.

The Verify Module 34 may be implemented on Passthru, available at http://msdn.microsoft.com/en-us/library/dd163350.aspx, which is a sample NDIS intermediate miniport device from the Microsoft Development Network (MSDN). The function changed in one embodiment is MPSendPackets in miniport.c. Ethernet frames are filtered that are HTTP.

Intuitively, the Verify Module 34 at the network layer may reassemble ethernet frames in order to reconstruct the original transport layer data segments and then compute signatures. However, most signature algorithms are able to compute signatures incrementally. Since outgoing ethernet frames in the network stack are in order, the Verify Module 34 does not have to reassemble fragments. It just updates the corresponding signature for each fragment on-the-fly, which significantly reduces the time and memory costs.

In preferred embodiments the packet signature is not appended to each packet. Otherwise the removal of the signature of a packet in the Verify Module 34 would lead to recalculation of checksums, which is inefficient. To solve this problem, in network-based analyzer 18, 218 the Sign Module 32 sends encrypted signatures directly to the Verify Module 34 as shown in FIG. 12. Signatures may then be kept in a hash table indexed by packet source and destination addresses and ports for fast lookup.

In certain embodiments, for performance purposes a lightweight MAC algorithm UMAC is used, available at http://fastcrypto.org/umac/. This UMAC code may be ported from user space to kernel space.

To prevent the verification process from becoming a performance bottleneck, embodiment network-based analyzers 18, 218 may adopt a lazy detection approach where the network packets may be sent out without waiting for the verification results. This mechanism permits normal traffic flow without disruptions introduced by the security operations. Once anomalies are identified, the results for the suspicious traffic may be reported to the user.

To further improve the detection capabilities of the embodiment provenance verification mechanism, a novel bot detection approach is provided that may be termed input-traffic correlation analysis. It is noted that in the client-server or pull architecture (e.g., web applications), users initiate the requests, which typically involve keyboard or mouse events (it will be appreciated that the few exceptions, such as web server refresh operations, can be labeled using whitelists). Preferred embodiments monitor both the user input events and the outbound traffic, and perform a time-based correlation analysis among the two data sets. Such embodiments aim to identify the network packets that come from processes that do not have user input events within a reasonable time frame. The allowed time framework may be represented by a predefined threshold. An embodiment correlation analysis may be built on top of the provenance verification, which provides the process information of a network packet.

In an embodiment time-based correlation analysis, the static threshold specification may be removed by performing a linear regression analysis between the following two sets of time series: the timestamps on packets and the timestamps on user input events. It is then possible to derive a linear model that represents the normal correlation between the two time series. The model can be used to dynamically identify outliers. More fine-grained regression models may be further constructed that are specific to a particular application, by extracting and analyzing time series corresponding to the same process, for example, the timestamps of network packets and user inputs associated with the browser.

Figure 13A:
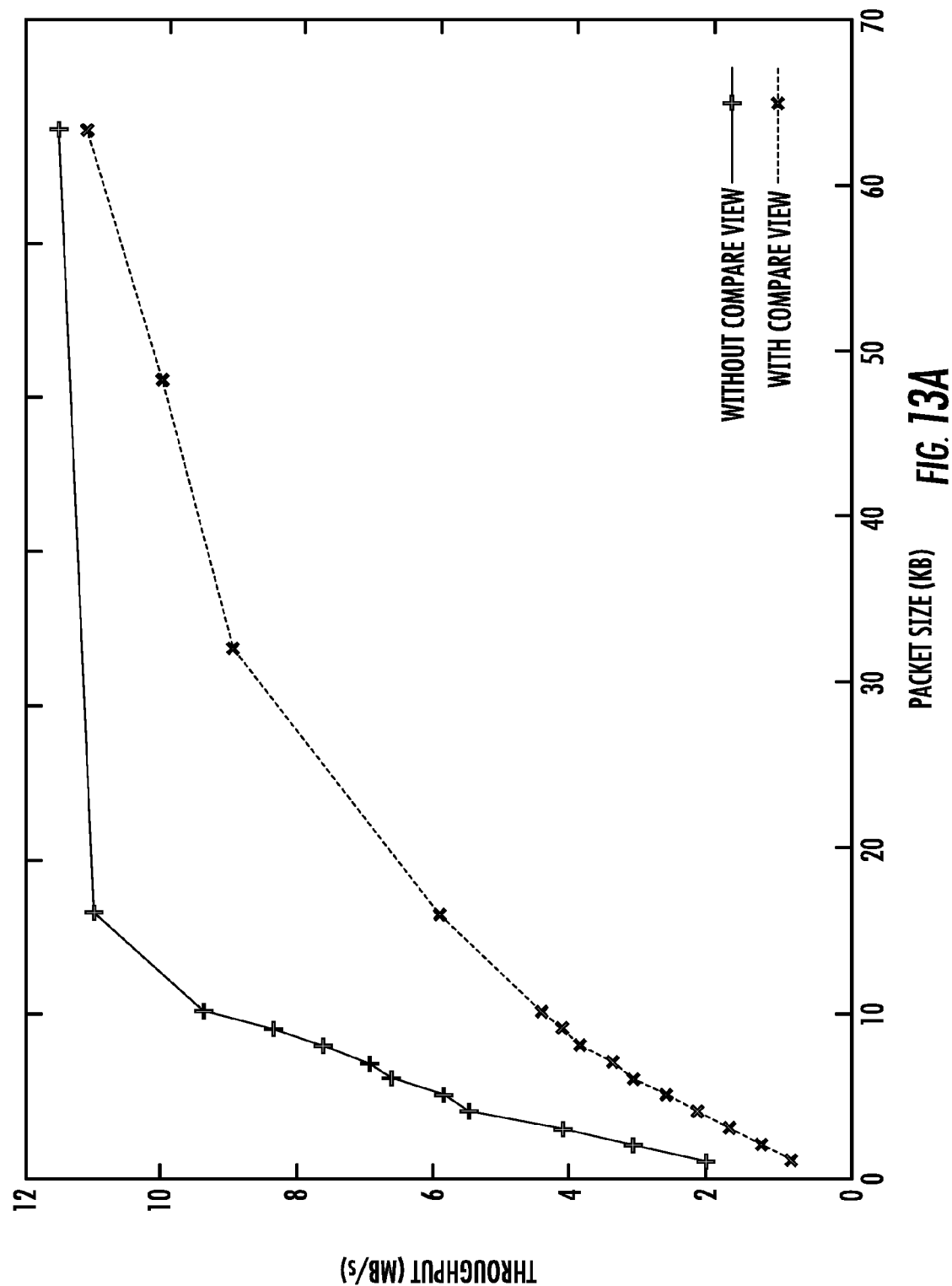
FIGS. 13A and 13B illustrates comparative throughput in a system employing an exemplary embodiment of the invention.

An exemplary embodiment of the invention in an XWindows environment named CompareView™ was used to evaluate overall performance characteristics. The overhead incurred by CompareView™ was estimated using two cases: one calculating signatures for whole packet; the other computing signatures for partial packet, e.g., the first 128 bytes. FIG. 13A shows the network throughput with and without using CompareView™ in the case of signing whole packets. With CompareView™, the throughout is lower in general. Yet, as the size of packet grows, the throughput is close to the ideal value.

Figure 13B:
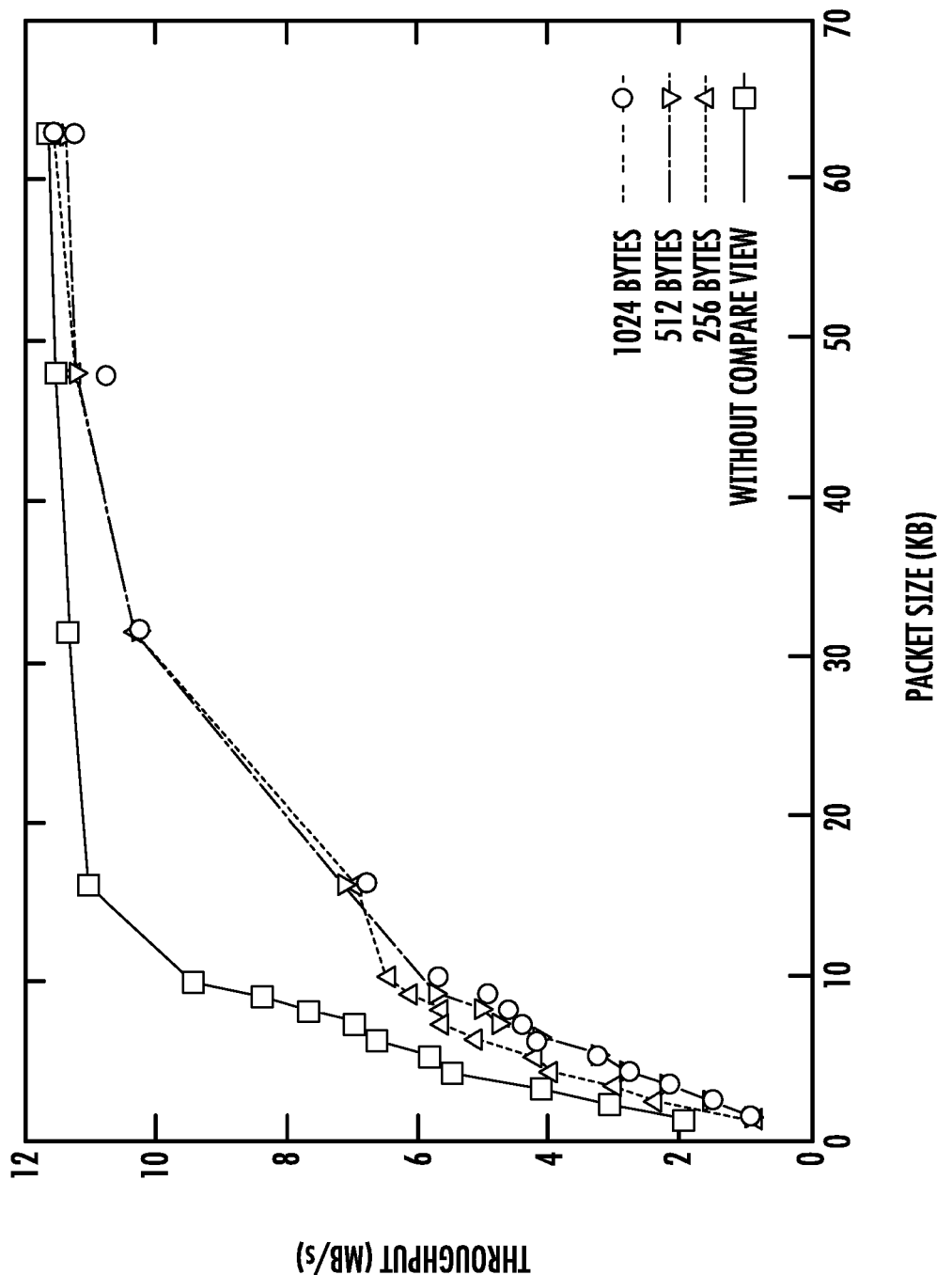
Figure 14:
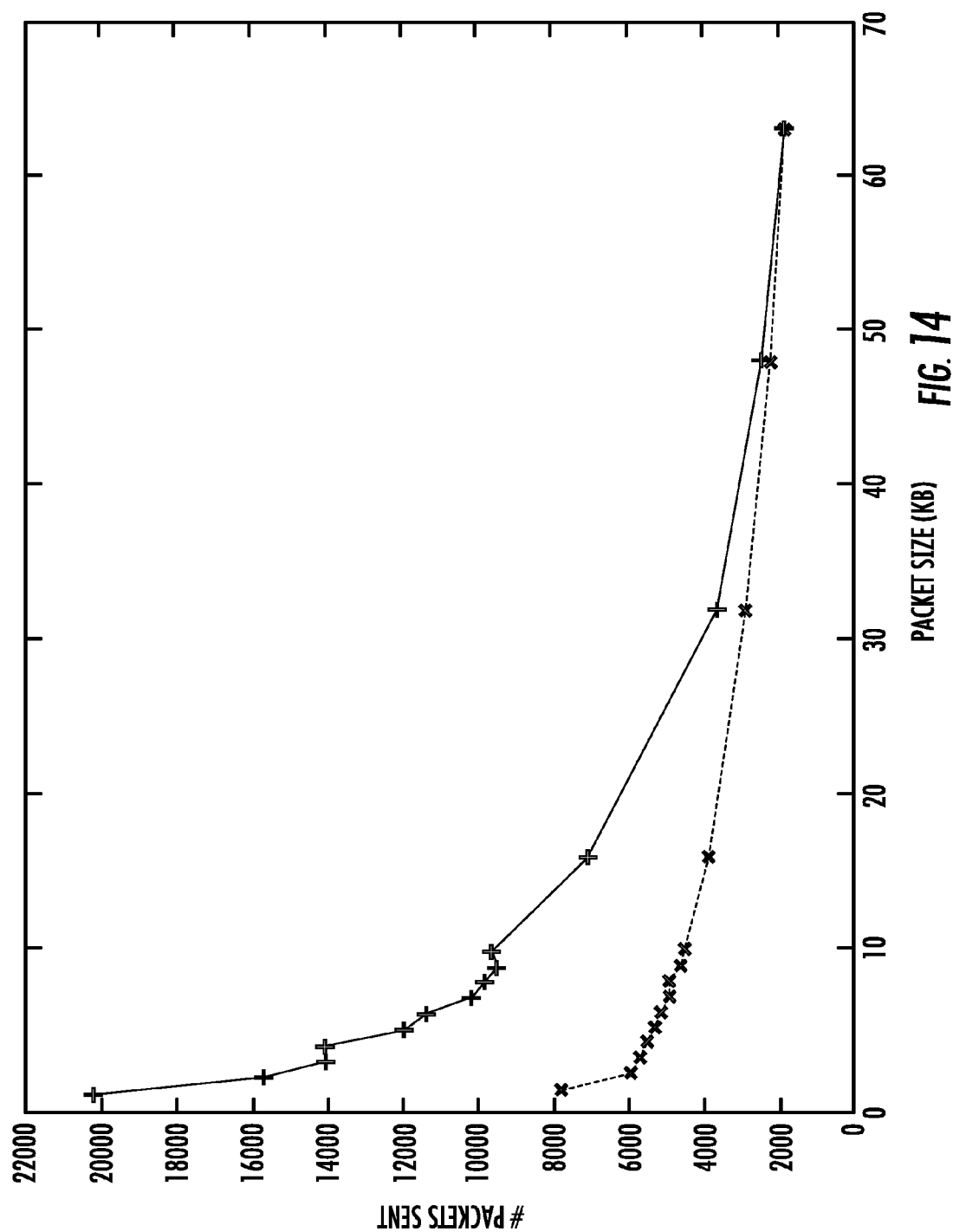
FIG. 14 illustrates comparative throughput with respect to packet size and number of packets sent in a system employing an exemplary embodiment of the invention.

FIG. 13B shows the network throughput in the case of signing partial packets. The performance is even better although the security is a little weaker. FIG. 14 shows the number of whole packets sent with and without CompareView™ with respect to packet size. It basically matched with FIGS. 13A and 13B. The observed performance degradation is minimal and acceptable in practice, because typically PCs have low upstream traffic even with P2P applications running.

CONCLUSIONS

Embodiments of the user-based analyzer are orthogonal to existing traffic-based botnet detection tools, which makes integration easy. The detection results produced by other means may serve as triggers (as discussed in Section 2.3) to invoke a remote authentication session. For example, an embodiment user-based analyzer 18, 218 can initiate a verification test for the user whenever BotSniffer or BotHunter, or any other malware detection program, identifies suspicious communication patterns. Note that embodiments of the user-based analyzer need not, however, rely on existing botnet detection solutions to work because the verification tests may be launched periodically or according to the trigger events defined by the user-based analyzer, as previously explained in Section 2.2.

CAPTCHA stands for Completely Automated Public Turing test to Tell Computers and Humans Apart. It is a well-known technique that attempts to differentiate between humans and machines on visual ability. In contrast, embodiments of the user-based analyzer are provide a fine-grained authentication and identification framework, whereas CAPTCHA is a more coarse-grained classification mechanism. Additionally, the user-based analyzer challenges may be personalized and individualized whereas CAPTCHA challenges are generic. Attacks on CAPTCHA typically are based on computer vision techniques and can be quite successful, as demonstrated in the art. However, a successful attack on an embodiment user-based analyzer requires forging a specific person's keystroke patterns, which represents a personalized type of attack as the attacker needs to learn about the typing patterns of the target.

The above discloses a novel human-behavior-based anomaly detection system and method, including the following three botnet detection techniques:

Keystroke authentication in a client-server or standalone architecture that provides a robust mechanism for distinguishing human users from bots.

An integrity verification mechanism that prevents bots from injecting fake keystroke events into computers.

A novel detection technique that can identify suspicious bot processes by analyzing the correlations between network traffic and input events of the processes.

Various embodiments employ these approaches to develop a user-based malware detection framework that explores the uniqueness of human keystroke dynamics, and uses it as a strong indicator for potential bot infection. Embodiments implement a keystroke authentication system that may include data collection, feature extraction, and classification. Comprehensive classification studies were performed on the keystroke data collected from a group of users. Several intelligent bot programs were developed that are capable of injecting synthesized statistical keystroke events into a (victim) machine. It was discovered that a human is capable of producing keystroke event sequences that would be difficult for a bot program to simulate, which can be explored and leveraged for better classification between humans and bots. Experiments demonstrated the feasibility and robustness of using keystroke dynamics for anomaly detection, and showed that embodiment user-based analyzers are able to correctly classify the attacks with low false negative and false positive rates.

Some embodiments may only collect and monitor the statistical information of the user's keystroke dynamics without explicitly popping up challenge windows. In other embodiments, the contents typed by the user may not be obtained or inferred by the server 200 for improved privacy protection. Certain embodiment user-based analyzers 18, 218 can be adopted to be used for continuous and non-intrusive authentication in both the stand-alone and client-server architectures by monitoring frequently typed strings, such as usernames, passwords, email addresses, URLs, etc. A database 20 of these strings ($s_i$, i=1, ..., M) and corresponding SVM models is created during an initial training phase. After the training phase the embodiment user-based analyzer runs in the background (non-intrusively) checking the stream of typed characters for matching strings in the database 20 and extracts features for evaluation against the trained models when a match occurs. One can think of the stream of characters as infinite and a window of variable length (depending on the length of $s_i$) sliding, with the user-based analyzer 18, 218 trying to match the contents of the window with the string $s_i$ for all i. When a match occurs the features of the typed string are classified as either owner or unknown. After a number of instances are classified as unknown the user may be notified of the suspicious behavior and (depending on the chosen configuration) the computer may be automatically locked, under the assumption that it's under attack. Conversely, if the majority of the instances are classified as owner then no suspicion arises.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A computer system for distinguishing user-initiated outbound network traffic from malware-initiated outbound network traffic, the system comprising:
   at least a central processing unit (CPU);
   at least an input device;
   networking hardware capable of carrying the network traffic; and
   memory communicatively coupled to the CPU, the memory comprising program code executable by the at least a CPU to perform the following steps:
   monitoring input events generated by the input device;
   monitoring outbound network traffic events;
   performing a time-based correlation analysis between the input events and the outbound network traffic events by performing a linear regression analysis between timestamps on outbound packets and timestamps on input events; and
   distinguishing malware-initiated outbound traffic according to the time-based correlation analysis.

* * * * *